(12) United States Patent  (10) Patent No.: US 11,983,393 B2
Tomotoshi et al.  (45) Date of Patent: May 14, 2024

(54) IMAGE PROCESSING METHOD AND IMAGE PROCESSING DEVICE

(71) Applicant: SEIKO EPSON CORPORATION, Tokyo (JP)

(72) Inventors: Akio Tomotoshi, Sapporo Atsubetsu-ku (JP); Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/856,822

(22) Filed: Jul. 1, 2022

(65) Prior Publication Data
US 2023/0004282 A1 Jan. 5, 2023

(30) Foreign Application Priority Data

Jul. 2, 2021 (JP) ................. 2021-110701

(51) Int. Cl.
G06F 3/048 (2013.01)
G06F 3/04845 (2022.01)
G06F 3/0485 (2022.01)
G06F 3/04883 (2022.01)
G06F 3/0354 (2013.01)
G06F 3/042 (2006.01)
G06F 3/04817 (2022.01)

(52) U.S. Cl.
CPC ........ *G06F 3/04845* (2013.01); *G06F 3/0485* (2013.01); *G06F 3/04883* (2013.01); *G06F 3/03542* (2013.01); *G06F 3/0425* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 8,558,872 B1 * | 10/2013 | Cho | G06T 11/20 348/43 |
| 2002/0180757 A1 * | 12/2002 | Duerr | G06F 3/14 345/620 |
| 2012/0069045 A1 * | 3/2012 | Hashimoto | G06F 3/1415 345/589 |
| 2012/0198370 A1 * | 8/2012 | Aso | G06F 8/34 715/763 |
| 2012/0280948 A1 * | 11/2012 | Barrus | G06F 3/04883 345/179 |

(Continued)

FOREIGN PATENT DOCUMENTS

| | | |
|---|---|---|
| JP | 2005-165633 A | 6/2005 |
| JP | 2010-134897 A | 6/2010 |

(Continued)

*Primary Examiner* — Hua Lu
(74) *Attorney, Agent, or Firm* — Oliff PLC

(57) ABSTRACT

An image processing method includes displaying a first screen on a display surface, the first screen including at least a part of a drawing area in which at least one object image drawn by a user is arranged, excluding an area in which at least a part of an object image included in the first screen is arranged from the drawing area when an operation of erasing the at least a part of the object is received, and displaying a reduced screen on the display surface when an operation is received, the reduced screen being obtained by reducing a whole of the drawing area into a size of the display surface.

8 Claims, 16 Drawing Sheets

(56) References Cited

U.S. PATENT DOCUMENTS

| | | | | |
|---|---|---|---|---|
| 2013/0093666 | A1* | 4/2013 | Nagai | G06V 30/333 |
| | | | | 345/156 |
| 2014/0285827 | A1* | 9/2014 | Kuronuma | G06F 3/04886 |
| | | | | 358/1.6 |
| 2014/0325435 | A1* | 10/2014 | Jung | G06F 3/04845 |
| | | | | 715/790 |
| 2015/0212713 | A1* | 7/2015 | Takehara | G06F 3/04845 |
| | | | | 715/801 |
| 2015/0277729 | A1* | 10/2015 | Kobayashi | G06F 3/011 |
| | | | | 715/753 |
| 2015/0278983 | A1* | 10/2015 | Uefuji | G09G 5/003 |
| | | | | 345/173 |
| 2017/0140504 | A1* | 5/2017 | Jeong | G06F 1/1677 |
| 2017/0285742 | A1* | 10/2017 | Marggraff | G06F 3/04883 |
| 2018/0173362 | A1* | 6/2018 | Kanki | G06F 3/04883 |
| 2018/0173411 | A1* | 6/2018 | Kanki | G06F 3/0483 |
| 2020/0082795 | A1* | 3/2020 | Ano | G09G 3/001 |
| 2021/0096709 | A1* | 4/2021 | Yeh | G06F 3/04166 |
| 2022/0091809 | A1* | 3/2022 | Nagano | G06F 3/04845 |

FOREIGN PATENT DOCUMENTS

| | | |
|---|---|---|
| JP | 2015-197796 A | 11/2015 |
| JP | 2015-203989 A | 11/2015 |
| JP | 2017-049904 A | 3/2017 |
| JP | 2018-101054 A | 6/2018 |
| JP | 2018-101296 A | 6/2018 |

* cited by examiner

| | | |
|---|---|---|
| R → | PROJECTION RANGE (X,Y) | P1=(0,0), P2=(1919,1079) |
| D → | DRAWING AREA (x,y) | p1=(0,0), p2=(1919,1079) |
| | PROJECTION RANGE DISPLACEMENT | (x,y)=(0,0) |
| | SCALING RATIO | 100% |

| | | |
|---|---|---|
| R | PROJECTION RANGE (X,Y) | P1=(0,0), P2=(1919,1079) |
| D | DRAWING AREA (x,y) | p1=(0,0), p2=(1919,1079) |
| | PROJECTION RANGE DISPLACEMENT | (x,y)=(−400,200) |
| | SCALING RATIO | 100% |

FIG. 26
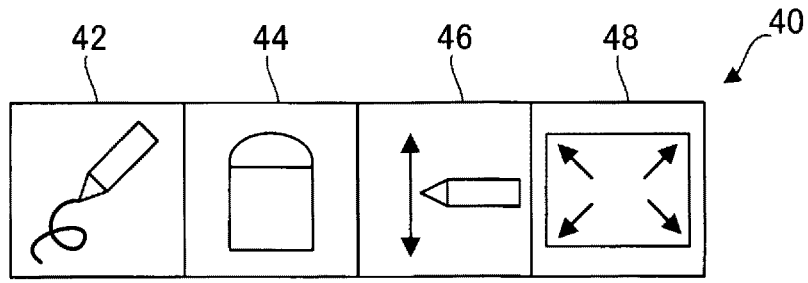
FIG. 27
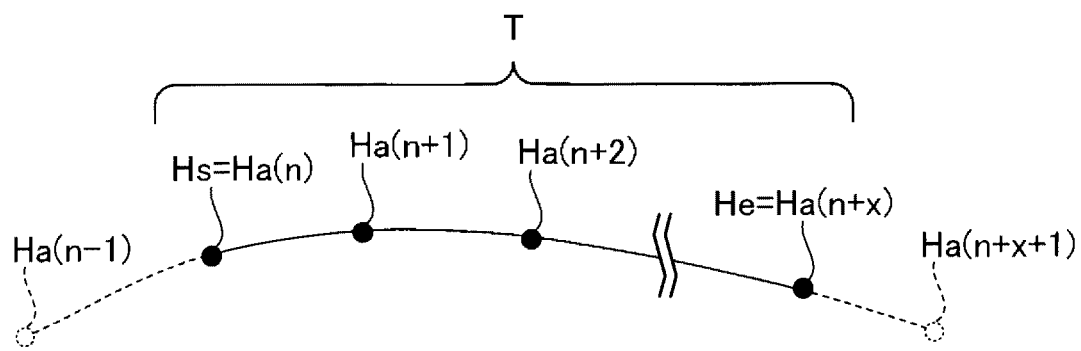
FIG. 28
| OBJECT IDENTIFICATION NUMBER (N1) | COORDINATE (N2) | COLOR (N3) | LINE TYPE (N4) | WIDTH (N5) |
|---|---|---|---|---|
| 1 | (x1,y1),(x2,y2)⋯(xn,yn) | COLOR 1 | LINE TYPE 1 | 1.5 |
| 2 | (x3,y3),(x4,y4)⋯(xm,ym) | COLOR 1 | LINE TYPE 1 | 1.5 |
| 3 | (x5,y5),(x6,y6)⋯(xl,yl) | COLOR 2 | LINE TYPE 2 | 0.8 |
| ⋮ | ⋮ | ⋮ | ⋮ | ⋮ |

IMAGE PROCESSING METHOD AND IMAGE PROCESSING DEVICE

The present application is based on, and claims priority from JP Application Serial Number 2021-110701, filed Jul. 2, 2021, the disclosure of which is hereby incorporated by reference herein in its entirety.

BACKGROUND

1. Technical Field

The present disclosure relates to an image processing method and an image processing device.

2. Related Art

In the past, there has been known a device which displays a drawn image based on a drawing input from the user, and which is capable of expanding a drawing area in which a drawn object is arranged. For example, when the drawing input to a drawing input screen is made, a drawing processing device described in JP-A-2010-134897 performs screen display of drawing information based on the drawing input, and at the same time, converts a coordinate of the drawing information into a two-dimensional coordinate on an imaginary imaging space, and then stores the result. When scrolling the drawing input screen and performing the drawing input, the coordinate of the drawing space is expanded so as to include the drawing information. Further, a total drawing information display processor displays a total drawing information display screen including total drawing information.

It is unachievable for the related-art technology described above to change a size of the imaginary drawing space having once been expanded. Therefore, there is room for improvement in operability since there is a possibility that the size of the total drawing information display screen does not change even when, for example, a part of the drawing information is erased, and the remaining drawing information is displayed in a small size.

SUMMARY

An image processing method according to an aspect of the present disclosure includes the steps of displaying a first screen on a display surface, the first screen including at least a part of a drawing area as an area in which at least one object image drawn by a user is arranged, excluding an area in which at least a part of an object image included in the first screen is arranged from the drawing area when an operation of erasing the at least a part is performed, and displaying a reduced screen on the display surface when a predetermined operation is received, the reduced screen being obtained by reducing a whole of the drawing area into a size of the display surface.

An image processing device according to an aspect of the present disclosure includes a display device, and at least one processing unit, wherein the processing unit executes the steps of displaying a first screen on a display surface using the display device, the first screen including at least apart of a drawing area as an area in which at least one object image drawn by a user is arranged, excluding an area in which at least a part of an object image included in the first screen is arranged from the drawing area when an operation of erasing the at least a part is performed, and displaying a reduced screen on the display surface when a predetermined operation is received, the reduced screen being obtained by reducing a whole of the drawing area into a size of the display surface.

BRIEF DESCRIPTION OF THE DRAWINGS

FIG. 26 is an enlarged view of drawing menu icons.

FIG. 27 is a diagram schematically showing a trajectory of a contact position of the pointer.

FIG. 28 is a diagram schematically showing a drawing datum.

DESCRIPTION OF AN EXEMPLARY EMBODIMENT

Figure 1:
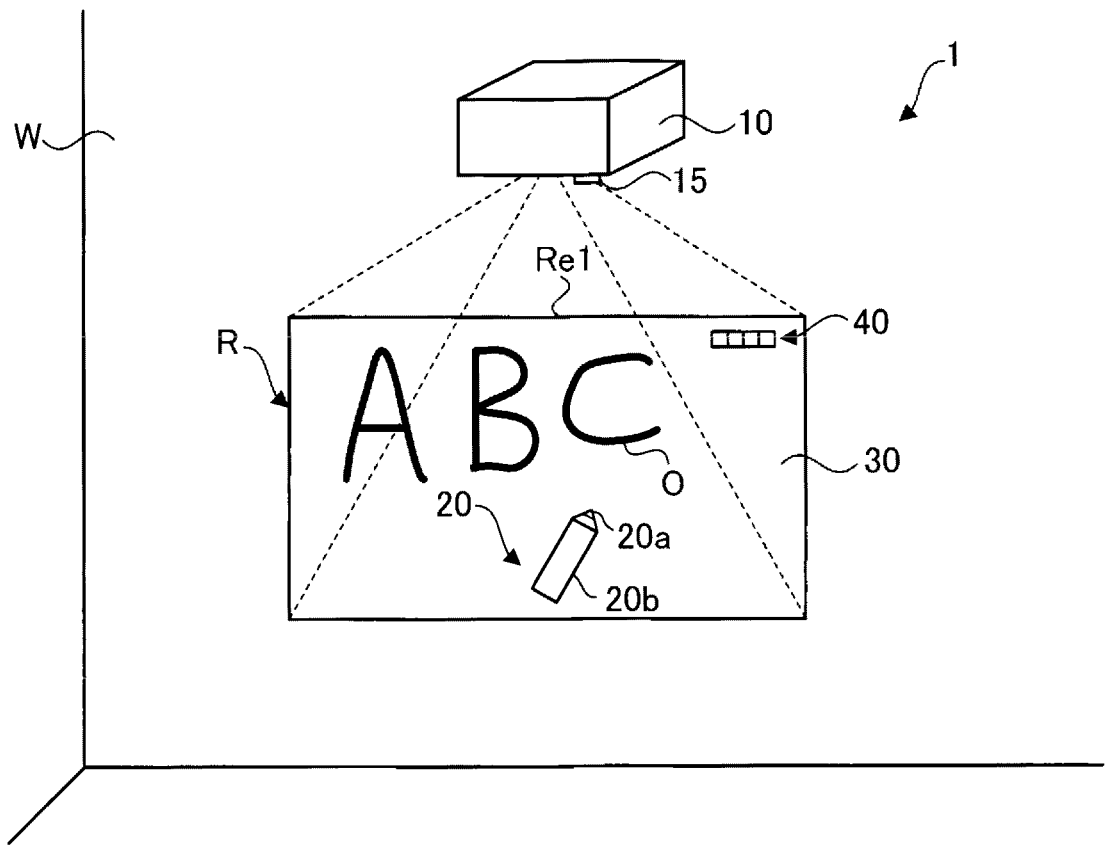
FIG. 1 is a diagram showing a projector system 1 including a projector according to a first embodiment.

A preferred embodiment related to the present disclosure will hereinafter be described with reference to the accompanying drawings. It should be noted that in the drawings, dimensions or scale sizes of each section are arbitrarily different from the reality, and some portions are shown schematically in order to make understanding easy. Further, the scope or the spirit of the present disclosure is not limited to the embodiment unless there is a particular description of limiting the present disclosure in the following explanation.

A. OUTLINE OF PROJECTOR SYSTEM 1

FIG. 1 is a diagram showing a projector system 1 including a projector 10 according to the embodiment. The projector system 1 includes the projector 10 and a pointer 20.

The projector 10 is installed in a portion of a wall W located above an upper end Re1 of a projection range R. The projector 10 can be installed on, for example, a desk, a table, or the floor, or can also be suspended from the ceiling instead of being installed on the wall W. In the present embodiment, the projection range R is, for example, a part of the wall W. The projection range R can be a screen, a door, a whiteboard, or the like besides the part of the wall W. The projection range R is an example of a display surface. The projector 10 projects an image on the projection range R to thereby display the image in the projection range R. The projector 10 is an example of an image processing device.

The pointer 20 is, for example, a pen-type pointing tool. The shape of the pointer 20 is not limited to a shape of a pen, and can also be, for example, a circular cylinder, a prismatic column, a circular cone, or a pyramidal shape. The user grips, for example, a shaft 20b of the pointer 20, and translates the pointer 20 on the projection range R while making a tip 20a have contact with the projection range R.

The projector 10 images the projection range R with a camera 15 to thereby generate an imaging datum representing a taken image. The projector 10 analyzes the taken image to thereby identify a position of the pointer 20. As described later, in the present embodiment, a position where infrared light emitted from a first light source 23 of the pointer 20 has been detected on an infrared light taken image is assumed as a contact position where the tip 20a of the pointer 20 has contact with the projection range R.

The projector 10 can operate in a drawing mode in which a drawing input from the user is received. Although the details will be described later, in the drawing mode, the user performs drawing using the pointer 20 like a writing tool. The projector 10 detects a movement trajectory of the pointer 20 in a period in which the pointer 20 has contact with the projection range R, and then display a line along the movement trajectory in the projection range R. In the present embodiment, the trajectory of the contact position in a period from when the pointer 20 makes contact with the projection range R to when the pointer 20 is separated from the projection range R is treated as a single object image O. In FIG. 1, the drawing reception screen 30 including a plurality of object images O drawn by the user is displayed in the projection range R. Further, in the drawing mode, the drawing menu icons 40 are displayed in the projection range R. It is possible for the user to switch a variety of operations in the drawing mode by selecting the drawing menu icons 40. The details of the drawing menu icons 40 will be described later.

B. CONFIGURATION OF POINTER 20

Figure 2:
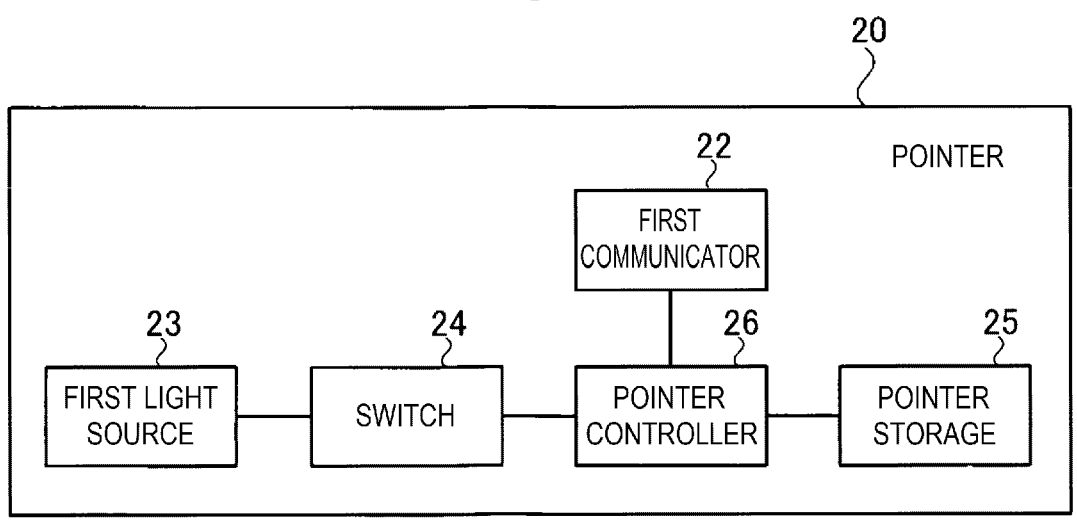
FIG. 2 is a diagram showing an example of a configuration of a pointer.

FIG. 2 is a diagram showing an example of a configuration of the pointer 20. The pointer 20 includes a first communicator 22, a first light source 23, a switch 24, a pointer storage 25, and a pointer controller 26.

The first communicator 22 has a communication circuit, an antenna, and so on, and performs wireless communication with the projector 10 using Bluetooth. Bluetooth is a registered trademark. Bluetooth is an example of a near field wireless communication system. The near field wireless communication system is not limited to Bluetooth, but can also be, for example, Wi-Fi. Wi-Fi is a registered trademark. The communication system of the wireless communication between the first communicator 22 and the projector 10 is not limited to the near field wireless communication system, but can also be other communication systems. Further, when the first communicator 22 performs wired communication, there are provided a communication circuit, a connector to which communicating lines are connected, and so on.

The first light source 23 is an LED (Light Emitting Diode) for emitting infrared light. The first light source 23 is not limited to the LED, but can also be, for example, an LD (Laser Diode) for emitting the infrared light. The first light source 23 emits the infrared light for making the projector 10 recognize the contact position of the pointer 20.

The switch 24 turns ON when pressure acts on the tip 20a of the pointer 20, and turns OFF when the pressure applied on the tip 20a is released. The switch 24 functions as a sensor for detecting whether or not the tip 20a has contact with the projection range R. The first light source 23 turns ON and OFF in tandem with the switch 24 turning ON and OFF. In other words, when the pressure acts on the tip 20a of the pointer 20, the switch 24 turns ON, and the first light source 23 emits light. Further, when the pressure applied on the tip 20a is released, the switch 24 turns OFF, and the first light source 23 stops emitting light.

The pointer storage 25 is a nonvolatile semiconductor memory such as a flash memory. The pointer storage 25 stores a control program to be executed by the pointer controller 26.

The pointer controller 26 is constituted by, for example, a single processor, or a plurality of processors. Citing an example, the pointer controller 26 is formed of a signal CPU (Central Processing Unit) or a plurality of CPUs. Some or all of the functions of the pointer controller 26 can also be configured by a circuit such as a DSP (Digital Signal Processor), an ASIC (Application Specific Integrated Circuit), a PLD (Programmable Logic Device), or an FPGA (Field Programmable Gate Array). The pointer controller 26 executes a variety of types of processing in parallel or in sequence.

The pointer controller 26 executes the control program stored in the pointer storage 25 to thereby realize a variety of functions. For example, in the circumstance in which the switch 24 is in an ON state, the pointer controller 26 puts the first light source 23 ON when the first communicator 22 receives a sync signal from the projector 10. The sync signal is a signal for synchronizing a lighting timing of the first light source 23 with an imaging timing of the camera 15.

C. CONFIGURATION OF PROJECTOR 10

Figure 3:
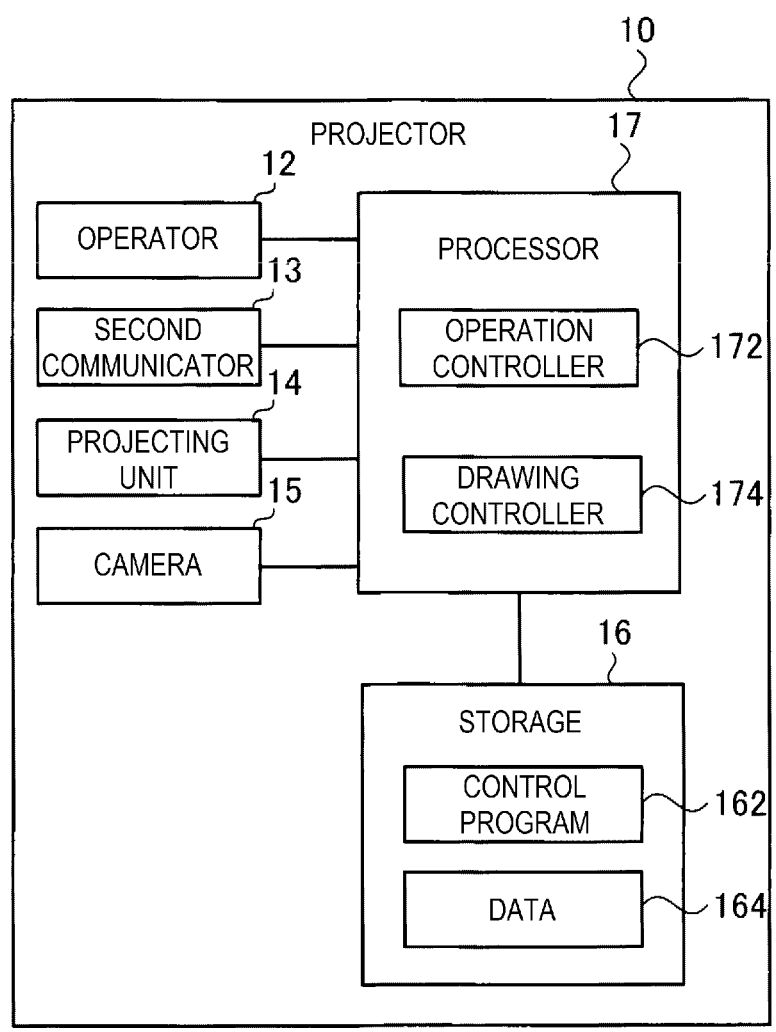
FIG. 3 is a diagram showing an example of a configuration of the projector.

FIG. 3 is a diagram showing an example of a configuration of the projector 10. The projector 10 includes an operator 12, a second communicator 13, a projecting unit 14, a camera 15, a storage 16, and a processing unit 17.

The operator 12 is, for example, a variety of operating buttons, operating keys, or a touch panel. The operator 12 is provided to, for example, a chassis of the projector 10. Further, the operator 12 can be a remote controller disposed separately from the chassis of the projector 10. The operator 12 receives an input operation from the user.

The second communicator 13 has a communication circuit, an antenna, and so on, and performs the wireless communication with the first communicator 22 of the pointer 20 using Bluetooth. As described above, the communication system for the wireless communication is not limited to Bluetooth, but can also be, for example, Wi-Fi. It should be noted that when the second communicator 13 performs wired communication, there are provided a communication circuit, a connector to which communicating lines are connected, and so on.

The projecting unit 14 projects an image on the projection range R to thereby display the image in the projection range R. The projecting unit 14 is an example of a display device, and is provided with an image processing circuit, a frame memory, a liquid crystal light valve, a light valve drive circuit, a light source, a projection optical system, and so on. When the image processing circuit receives an image datum from an image supply device such as the processing unit 17 or a computer not shown, the image processing circuit develops the image datum in the frame memory, and then performs necessary image processing. This image processing is, for example, processing of converting the resolution of the image datum into the resolution of the liquid crystal light valve, a geometric correction process for resolving a keystone distortion, or the like. The image datum on which the image processing has been performed is converted into an image signal, and by the liquid crystal light valve and so on being driven based on the image signal, the image datum is projected as the image. It should be noted that as the projecting unit 14, it is possible to adopt, for example, a DLP (Digital Lighting Processing; a registered trademark) system besides the liquid crystal system using the liquid crystal light valve and so on described above.

The camera 15 takes an image of the projection range R to thereby generate the imaging datum representing the taken image. The camera 15 includes alight receiving optical system such as a lens, an imaging element for converting the light collected by the light receiving optical system into an electric signal, and so on. The imaging element is a CCD (Charge Coupled Device) image sensor for receiving the light in, for example, an infrared region or a visible light region. The camera 15 can also be provided with a filter for blocking apart of the light entering the imaging element. For example, in the camera 15, when making the imaging element receive the infrared light, the filter for mainly transmitting the light in the infrared region can be disposed in front of the imaging element. Further, in the camera 15, when making the imaging element receive the visible light, the filter for mainly transmitting the light in the visible light region can be disposed in front of the imaging element.

The camera 15 can be disposed as a separate member from the projector 10. In this case, the camera 15 and the projector 10 can be connected to each other with a wired or wireless interface so as to be able to perform transmission/reception of data.

When the camera 15 performs imaging with the visible light, there is taken, for example, the image projected by the projecting unit 14 on the projection range R. The datum of a visible light taken image generated by the camera 15 performing imaging with the visible light is hereinafter referred to as a "visible light imaging datum." The visible light imaging datum is used in, for example, a calibration described later.

When the camera 15 performs imaging with the infrared light, there is generated, for example, the imaging datum representing the infrared light emitted by the pointer 20. The datum of an infrared taken image generated by the camera 15 with the infrared light is hereinafter referred to as an "infrared light imaging datum." The infrared light imaging datum is used for detecting, for example, the contact position of the pointer 20 on the projection range R. In other words, the camera 15 is an example of a detection device for detecting information related to the position of the pointer 20.

The storage 16 is a recording medium which can be read by the processing unit 17. The storage 16 includes, for example, a nonvolatile memory and a volatile memory. As the nonvolatile memory, there can be cited, for example, a ROM (Read Only Memory), an EPROM (Erasable Programmable Read Only Memory), and an EEPROM (Electrically Erasable Programmable Read Only Memory). As the volatile memory, there can be cited, for example, a RAM. The volatile memory includes the frame memory described above.

The storage 16 stores a control program 162 to be executed by the processing unit 17, and a variety of types of data 164 to be used by the processing unit 17.

The control program 162 is executed by the processing unit 17. The control program 162 includes an operating system and a plurality of application programs. The plurality of application programs includes an application program for realizing an interactive function.

The data 164 include data representing processing conditions of a variety of types of processing to be executed by the processing unit 17. Further, the data 164 can also include data to be used in the image processing. Further, the data 164 include a calibration image datum representing a calibration image. In the calibration image, there are arranged marks having shapes set in advance at intervals.

The processing unit 17 is formed of, for example, a single processor, or a plurality of processors. Citing an example, the processing unit 17 is constituted by a signal CPU or a plurality of CPUs. Some or all of the functions of the processing unit 17 can be configured by a circuit such as a DSP, an ASIC, a PLD, or an FPGA. The processing unit 17 executes a plurality of types of processing in parallel or in sequence.

The processing unit 17 retrieves the control program 162 from the storage 16 and then executes the control program 162 to thereby function as an operation controller 172 and a drawing controller 174.

The operation controller 172 controls a variety of operations of the projector 10. The operation controller 172 executes, for example, the calibration. The calibration is processing of making a coordinate on the frame memory of the projecting unit 14 and a coordinate on the imaging datum correspond to each other. The coordinate on the frame memory corresponds to a position on the image to be projected on the projection range R. By the position on the frame memory and the position on the imaging datum being made to correspond to each other, it is possible to identify a portion corresponding to the contact position of the pointer 20 in the projection range R with respect to, for example, the image to be projected on the projection range R. The operation controller 172 executes the calibration to thereby generate a calibration datum for making the coordinate on the imaging datum by the camera 15 and the coordinate on the frame memory of the projecting unit 14 correspond to each other, and then store the calibration datum in the storage 16.

Besides the above, the operation controller 172 establishes the communication between, for example, the second communicator 13 and the first communicator 22 of the pointer 20. Further, after completing the calibration, the operation controller 172 makes the camera 15 perform imaging with the infrared light to generate the infrared light imaging datum at constant time intervals. Further, the operation controller 172 transmits the sync signal from the second communicator 13 to the pointer 20 in sync with the imaging timing of the camera 15.

The drawing controller 174 controls an operation of the projector 10 during the drawing mode. More particularly, the drawing controller 174 displays the drawing reception screen 30 in the projection range R, and then receives the drawing input using the pointer 20 from the user. Further, the drawing controller 174 displays the object image O based on the drawing input in the projection range R. The details of the drawing mode will hereinafter be described.

D. DETAILS OF DRAWING MODE

D-1. Projection Range R and Drawing Area D

Figure 4:
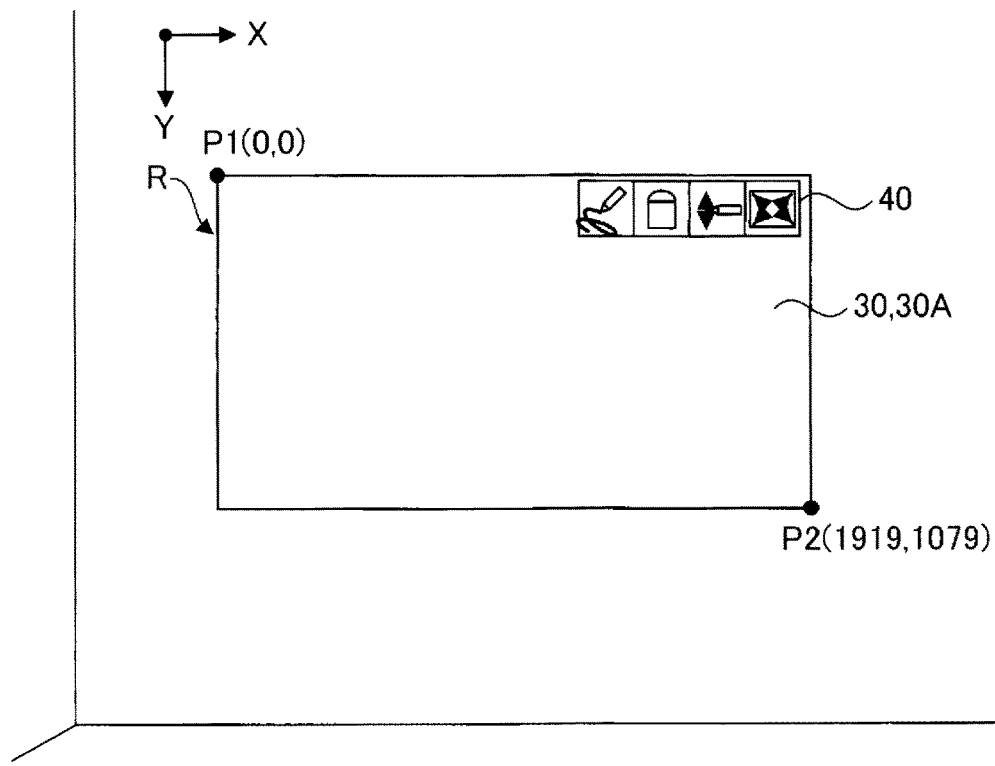
FIG. 4 is a diagram showing an example of a drawing reception screen.

FIG. 4 is a diagram showing an example of display in the projection range R when selecting the drawing mode. When selecting the drawing mode, the drawing reception screen 30 is displayed in the projection range R. The drawing reception screen 30 is a screen for receiving the drawing input from the user. In the drawing reception screen 30, there are displayed the drawing menu icons 40 described later. Hereinafter, when it is necessary to distinguish the individual drawing reception screens 30 from each other, there are used the descriptions of drawing reception screens 30A, 30B, . . . .

The coordinate of each point on the projection range R in the drawing reception screen 30 corresponds to a coordinate on the frame memory. In the present embodiment, the projection range R is located on an X-Y plane along an X axis and a Y axis perpendicular to the X axis. In other words, the X-Y plane is a plane representing a display plane. Hereinafter, an upper left point P1 of the projection range R is defined as a reference point, and a coordinate of a point on the projection range R is assumed as (X, Y). Each coordinate corresponds to a single pixel. The projection range R is a range from the point P1 (0,0) to a point P2 (1919,1079) on the X-Y plane. The drawing reception screen 30 is substantially the same in area as the projection range R, but it is possible to perform drawing in a region larger in area than the projection range R by expanding the drawing area D.

Figure 5:
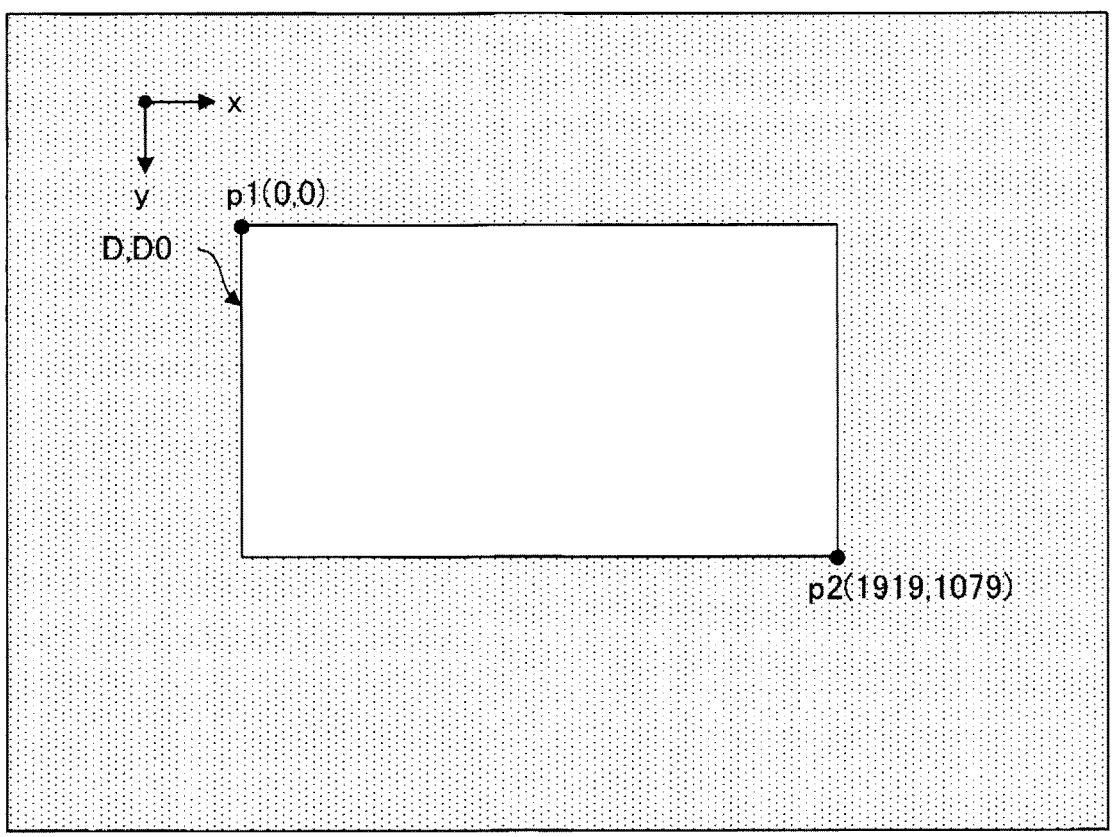
FIG. 5 is a diagram schematically showing a drawing area.
Figures 6, 7:
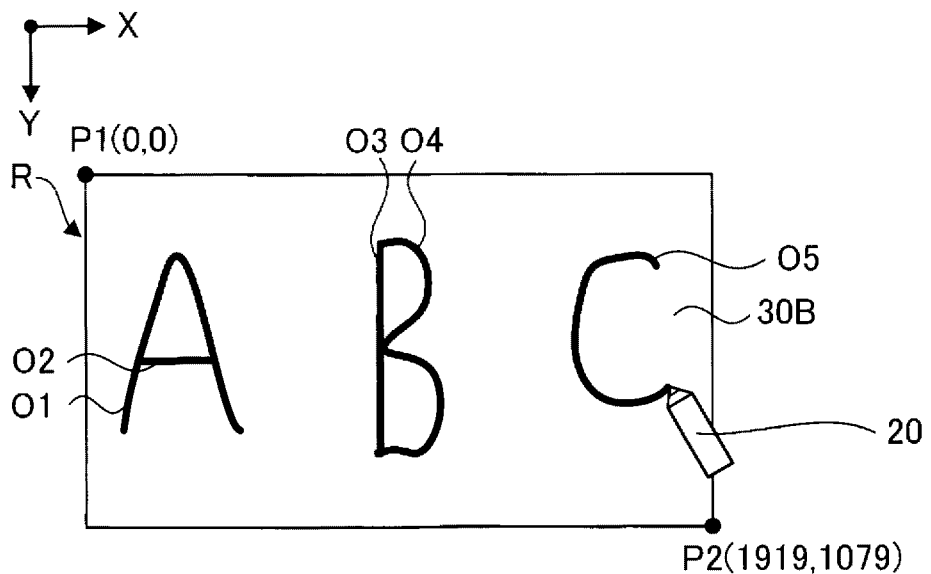
FIG. 6 is a diagram showing an example of a table of parameters representing a correspondence relationship between a projection range and the drawing area.
FIG. 7 is a diagram showing an example of the drawing reception screen.
Figures 10, 11:
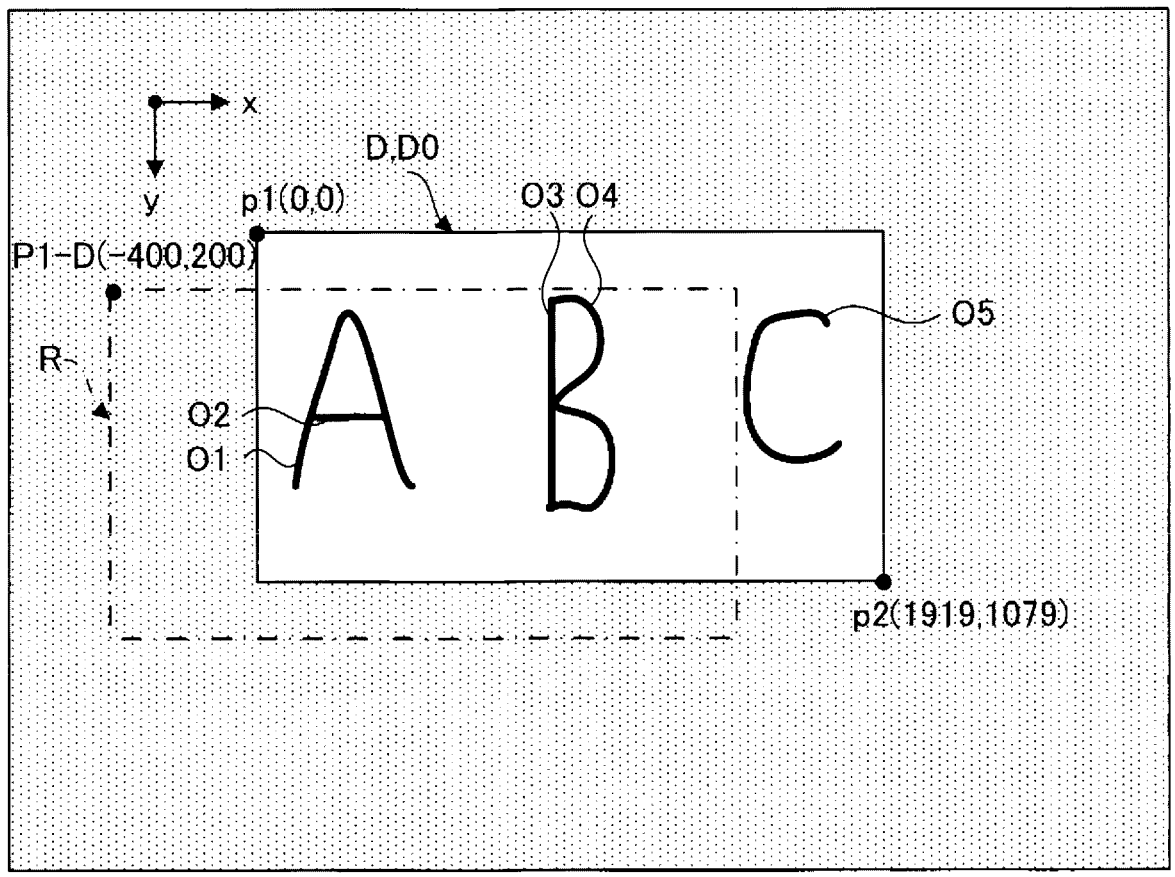
FIG. 10 is a diagram schematically showing the drawing area.
FIG. 11 is a diagram showing an example of the table of parameters representing the correspondence relationship between the projection range and the drawing area.
Figures 16, 17:
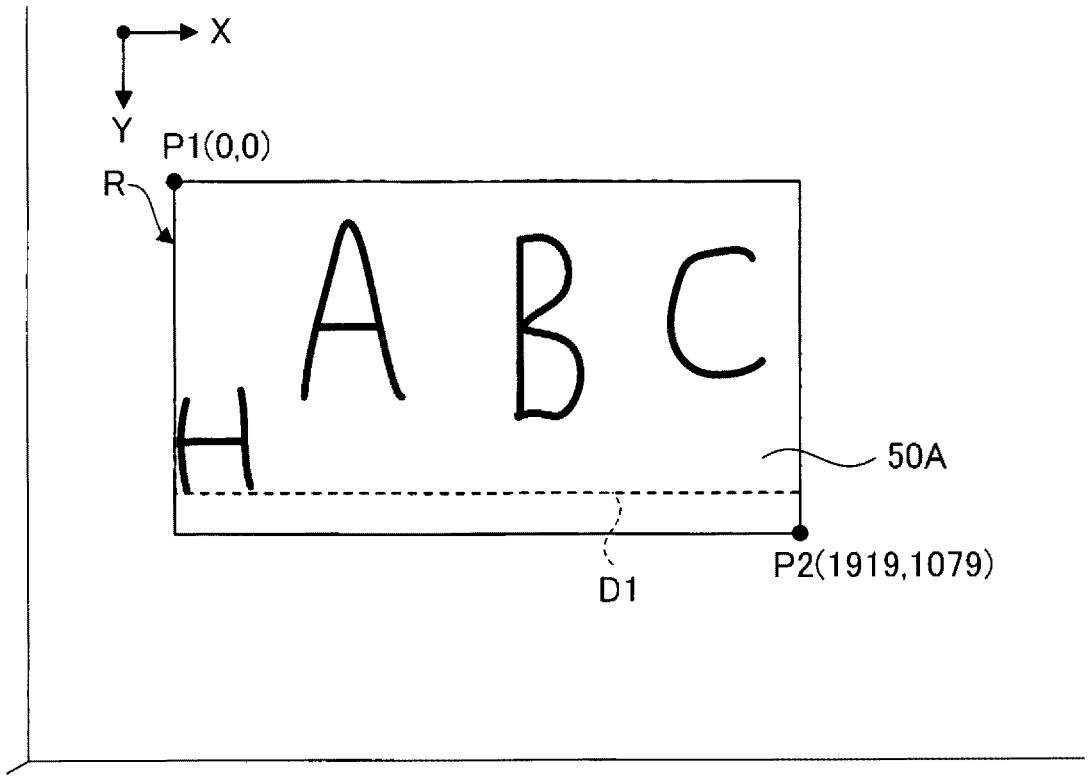
FIG. 16 is a diagram showing an example of a whole display screen.
FIG. 17 is a diagram showing an example of the table of the parameters representing the correspondence relationship between the projection range and the drawing area.

FIG. 5 is a diagram schematically showing the drawing area D. The drawing area D is an imaginary area in which a single object image O or a plurality of object images O drawn by the user is arranged. The object image O is stored in the storage 16 in reality as such a drawing datum DT as shown in FIG. 28. Further, the drawing area D is defined in reality by such parameters as shown in FIG. 6, FIG. 11, and FIG. 17. The drawing area D illustrated in the present embodiment is an area obtained by developing the drawing area D defined by the parameters shown in FIG. 6 and so on in an imaginary plane. The drawing control section 174 displays a part or whole of the drawing area D as the drawing reception screen 30 in the projection range R. In other words, the drawing controller 174 displays the drawing reception screen 30 including at least a part of the drawing area D in the display surface. It can be said that the user performs the drawing in the drawing area D via the drawing reception screen 30. In the present embodiment, the drawing area D is a plane along an x axis corresponding to the X axis and a y axis corresponding to the Y axis. In other words, the drawing area D is a rectangular area defined by the x axis as a first axis and the y axis as a second axis perpendicular to the x axis.

Hereinafter, an upper left point p1 of the drawing area D in FIG. 5 is defined as a reference point, and a coordinate of a point on the drawing area D is assumed as (x,y). In other words, the drawing area D is located on an x-y plane. The drawing area D is a range from the point p1 (0,0) to a point p2 (1919,1079) on the x-y plane. The range from the point p1 (0,0) to the point p2 (1919,1079) is an initial drawing area D0. The drawing reception screen 30 displayed in the projection range R immediately after the drawing mode is started is a screen for receiving drawing to the initial drawing area D0. In the state in which the initial drawing area D0 is displayed, a coordinate values in the drawing area D and coordinate values in the projection range R coincide with each other. For example, a coordinate (100,100) in the projection range R corresponds to a coordinate (100,100) in the drawing area D.

FIG. 6 is a table of the parameters representing the correspondence relationship between the projection range R shown in FIG. 4 and the drawing area D shown in FIG. 5. As described above, the projection range R is the range from the point P1 (0,0) to the point P2 (1919,1079) on the X-Y plane represented by the coordinate (X,Y). The drawing area D is represented by the coordinate (x, y), and is the range from the point p1 (0,0) to the point p2 (1919, 1079). A projection range displacement represents a displacement of the reference point P1 of the projection range R to the reference point p1 using the coordinate (x, y) of the drawing area D. The projection range displacement is a numerical value for making a point on the projection range R and a point on the drawing area D correspond to each other. The reference point P1 of the projection range R in FIG. 4 coincides with the reference point p1 of the drawing area D in FIG. 5. Therefore, the projection range displacement is zero in both of the x-axis direction and the y-axis direction. Further, a scaling ratio represents a degree of expansion or reduction of display in the projection range R to the object image O in the drawing area D in percentage. In the display in the projection range R in FIG. 4, the drawing area D in FIG. 5 is displayed on an unchanged scale, and thus, the scaling ratio is 100%.

Figure 8:
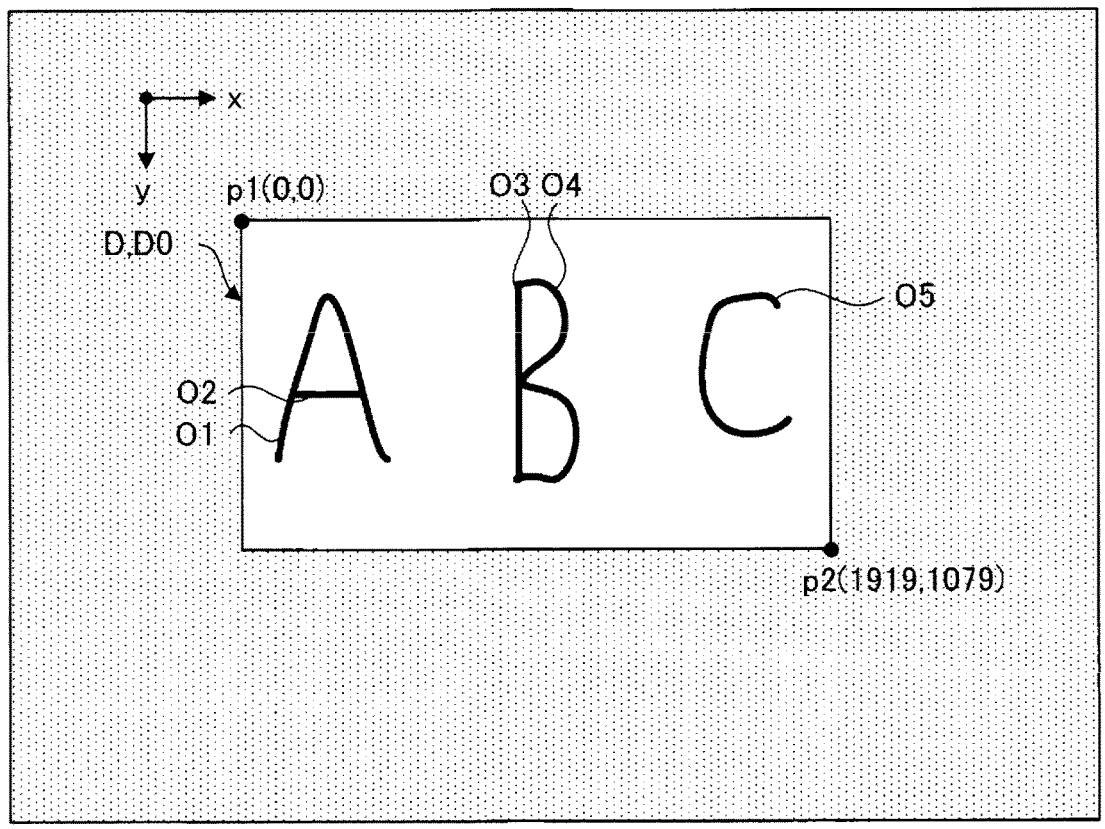
FIG. 8 is a diagram schematically showing the drawing area.

It is assumed that the user performs a drawing input as shown in, for example, FIG. 7 on the drawing reception screen 30A shown in FIG. 4. The drawing reception screen 30B in FIG. 7 is an example of a first screen. The drawing input to the drawing reception screen 30 is performed by moving the pointer 20 while keeping contact with the projection range R with a pen icon 42 described later selected. It should be noted that in terms of visibility, an illustration of the drawing menu icons 40 will be omitted in the drawings of the projection range R in FIG. 7 and subsequent drawings. In the drawing reception screen 30B shown in FIG. 7, there are displayed the plurality of object images O1 through O5 drawn by the user. In the example shown in FIG. 7, the object images O1 and O2 constitute a character of "A," the object images O3 and O4 constitute a character of "B," and the object image O5 constitutes a character of "C." In this case, as shown in FIG. 8, the object images O1 through O5 are recorded at positions in the drawing area D corresponding to positions of the object images O1 through O5 in the projection range R.

Figure 9:
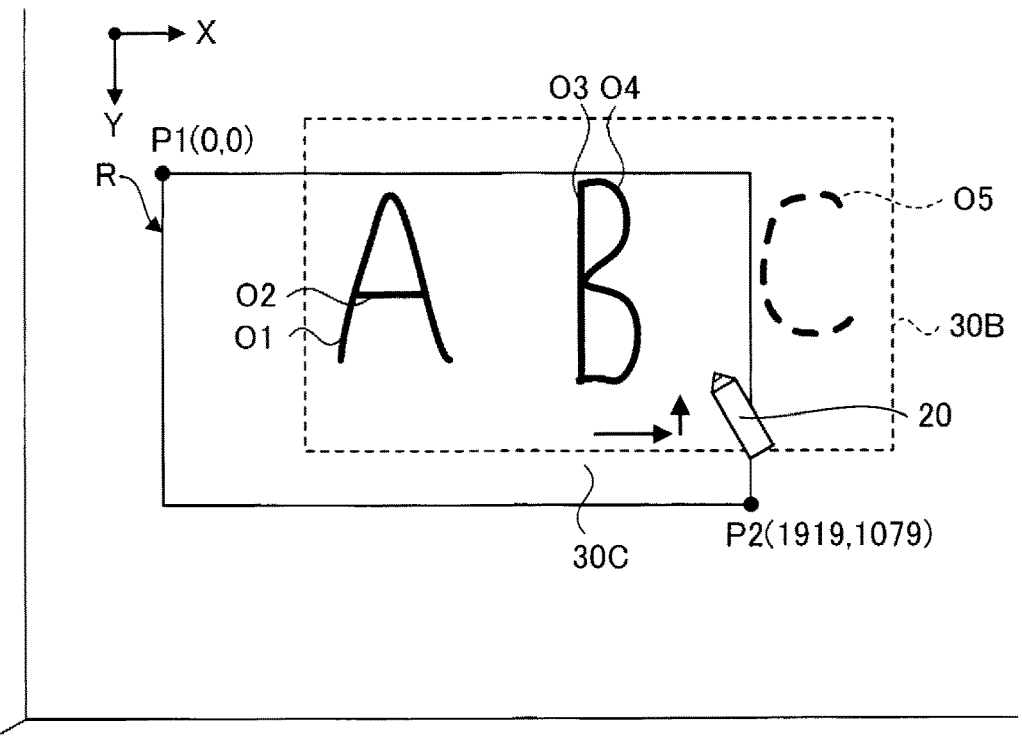
FIG. 9 is a diagram showing an example of the drawing reception screen.

It is assumed that the user performs scrolling of the drawing reception screen 30B shown in FIG. 7 as shown in, for example, FIG. 9. The scrolling of the drawing reception screen 30 is performed by moving the pointer 20 while keeping contact with the projection range R with a scroll icon 46 described later selected. In FIG. 9, the scrolling of the drawing reception screen 30B is performed in a rightward direction and an upper direction, and the range of the drawing area D displayed in the drawing reception screen 30C is shifted to the upper right after the scrolling. In other words, the drawing controller 174 displays the drawing reception screen 30C, which is a new drawing reception screen including the drawing area D corresponding to the scrolling operation on the drawing reception screen 30B, in the projection range R. The drawing reception screen 30C is an example of a second screen. After the scrolling, the object images O1 through O4 out of the object images O1 through O5 are displayed in the drawing reception screen 30C, and the object image O5 is located outside the display range. In FIG. 9, the display range of the drawing reception screen 30B which has not been scrolled, and the object image O5 which is set to a nondisplay state are represented by dotted lines. Further, FIG. 10 shows a positional relationship between the drawing area D and the projection range R. Due to the scrolling, although no change occurs in the drawing area D itself, a change occurs in the range to be displayed as the drawing reception screen 30 in the projection range R. Specifically, after the scrolling, the reference point P1 of the projection range R corresponds to a point P1-D (−400,200) in the drawing area D.

FIG. 11 is a table of the parameters representing the correspondence relationship between the projection range R shown in FIG. 9 and the drawing area D shown in FIG. 10. Among the parameters, the projection range displacement alone is different form that in FIG. 6. In other words, since the drawing area D is shifted in the rightward direction and the upward direction with respect to the projection range R, the reference point P1-D of the projection range R is shifted in a leftward direction and a downward direction with respect to the reference point p1 of the drawing area D. Therefore, the projection range displacement becomes (−400,200).

Figure 12:
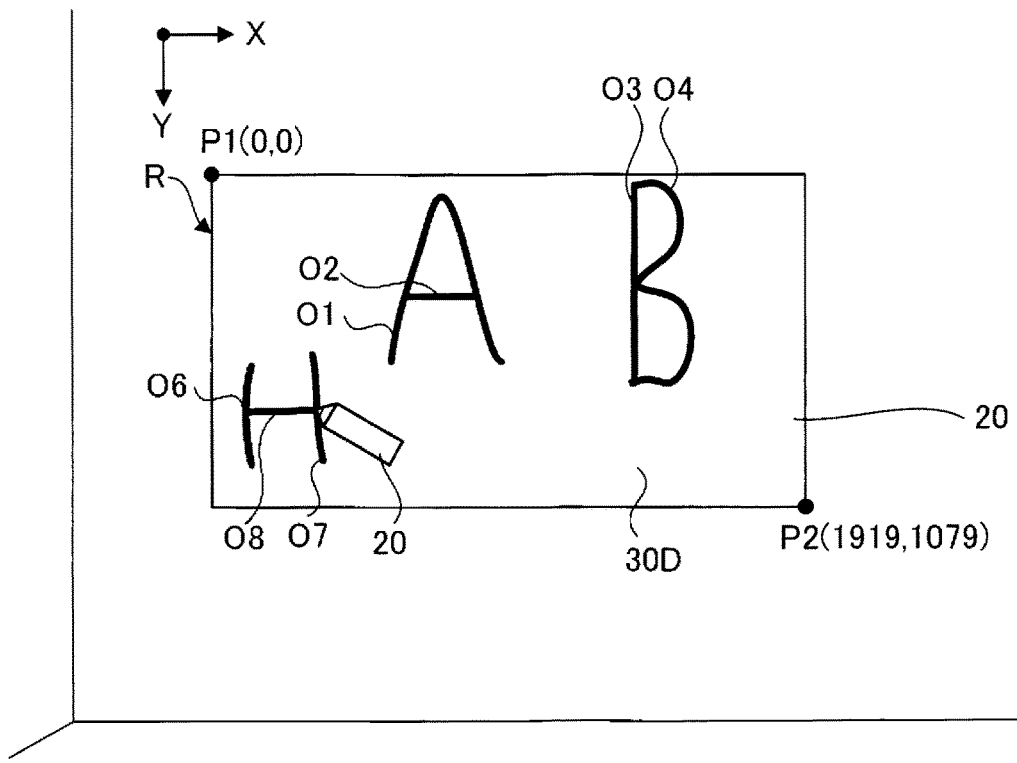
FIG. 12 is a diagram showing an example of the drawing reception screen.
Figure 13:
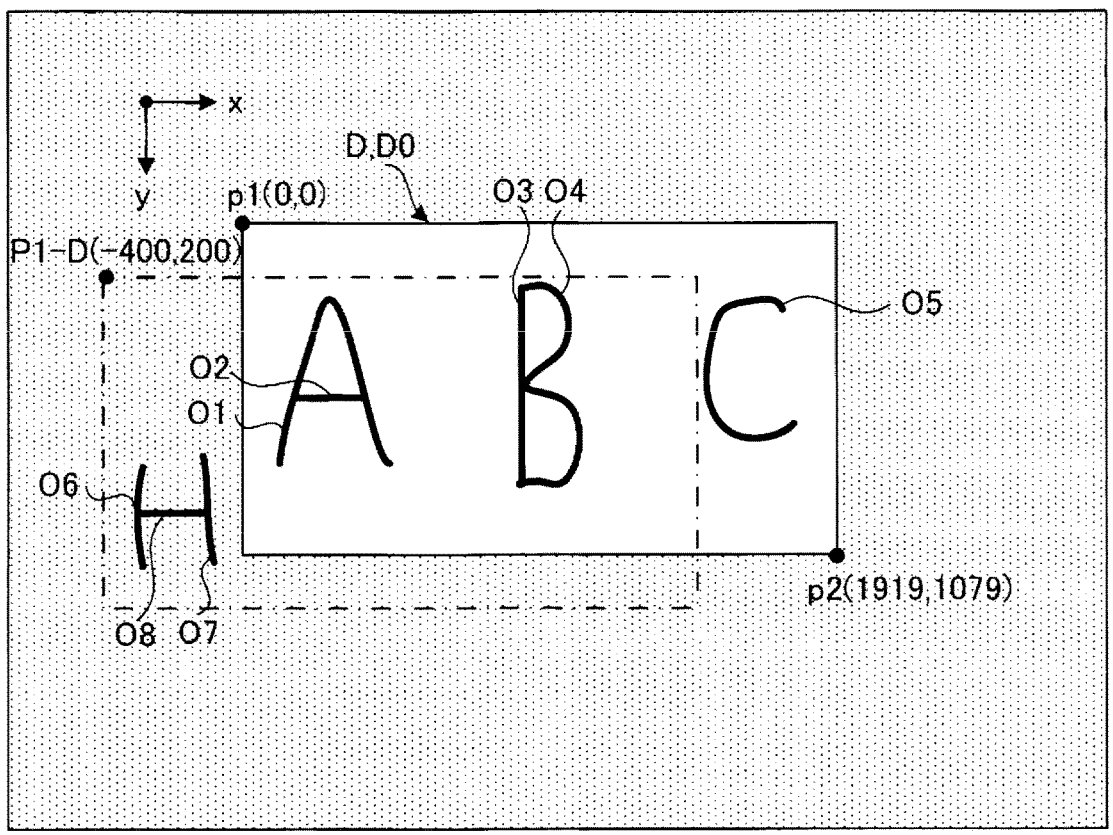
FIG. 13 is a diagram schematically showing the drawing area.

It is assumed that the user performs drawing on the drawing reception screen 30C shown in FIG. 9 as shown in, for example, FIG. 12. In the drawing reception screen 30D shown in FIG. 12, there are displayed object images O6 through O8 newly drawn by the user. The object images O6 through O8 constitute a character of "H." Also in this case, as shown in FIG. 13, the object images O6 through O8 are recorded in the drawing area D, but the object images O6 through O8 are located out of the drawing area D. Therefore, the drawing area D is expanded so that the object images O6 through O8 which have newly been added fall within the drawing area D. In other words, when an operation of drawing a new object image O in the drawing reception screen 30C, the drawing controller 174 adds an area in which the new object image O is arranged to the drawing area D.

D-2. Expansion of Drawing Area D

A method of expanding the drawing area D will hereinafter be described. When the pointer 20 moves on the projection range R in the state in which the pen icon 42 is selected, the drawing controller 174 detects the trajectory of the movement of the pointer 20. Here, as shown in FIG. 9 and so on, in the state in which the drawing area D has been scrolled, it is necessary to convert the coordinates in the projection range R into the coordinates in the drawing area D. The coordinates in the drawing area D can be obtained by a formula (1) described below. For example, in the drawing reception screen 30C shown in FIG. 9, when a dot is drawn at a coordinate (100,600) in the projection range R, the dot is located at a coordinate (−300, 800) in the drawing area D as a result.

$$\text{(coordinate in drawing area } D) = ((\text{coordinate in projection range } R) + (\text{projection range displacement}))/(\text{scaling ratio}) \quad (1)$$

Then, the drawing controller 174 identifies an arrangement area as an area in which the newly drawn object image O is arranged. The arrangement area is assumed as a rectangular area in which a pair of sides extend along the x axis, and the remaining two sides extend along the y axis. When all of the coordinates of the vertexes of the arrangement area are included in a range of the current drawing area D, the drawing controller 174 does not perform the expansion of the drawing area D. In contrast, when any of the vertexes of the arrangement area fails to be included in the range of the current drawing area D, the drawing controller 174 expands the drawing area D. In other words, the drawing controller 174 changes the range of the drawing area D so that all of the vertexes in the arrangement area are included within the range of the drawing area D.

Figure 14:
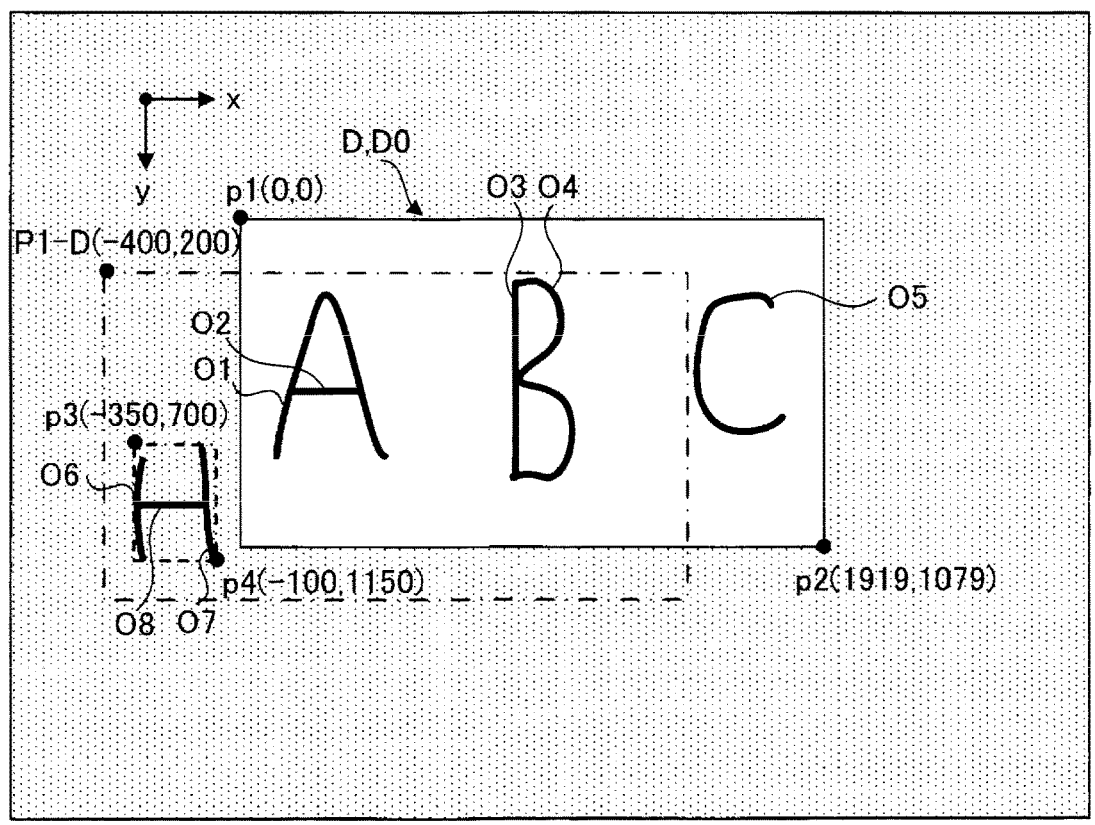
FIG. 14 is a diagram schematically showing the drawing area.
Figure 15:
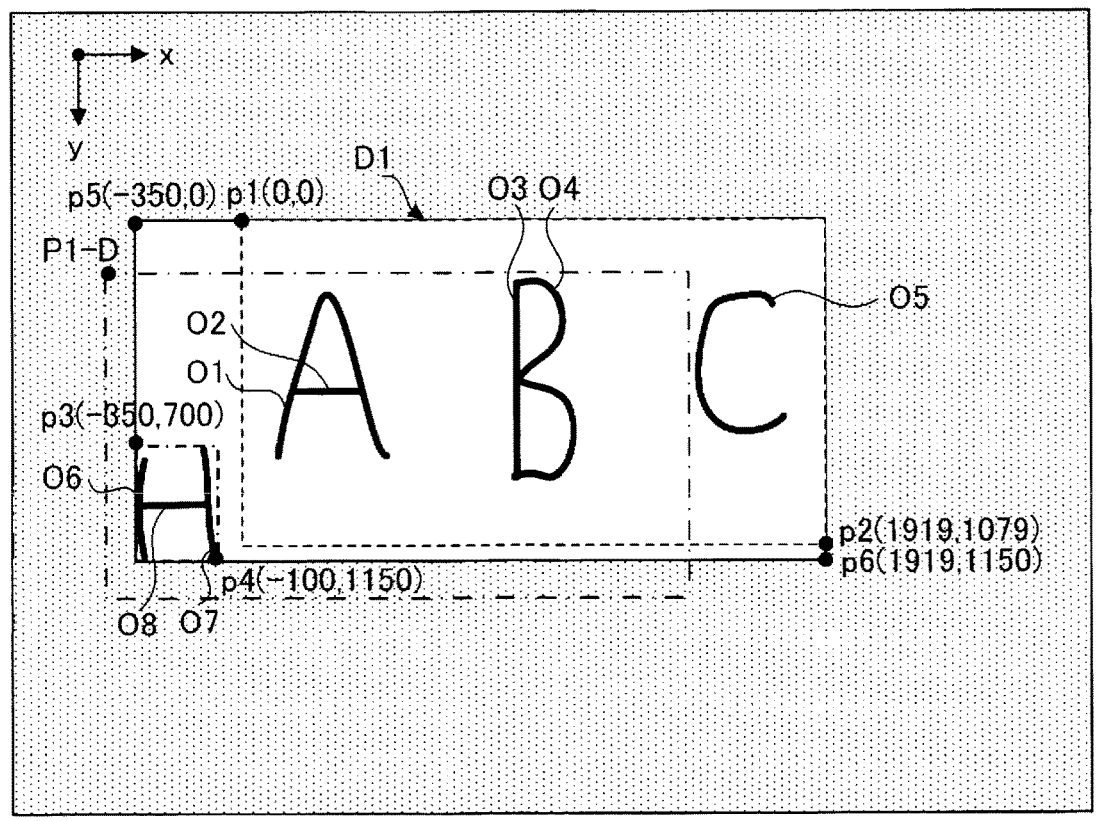
FIG. 15 is a diagram schematically showing the drawing area.

A specific description will be presented with reference to FIG. 14 and FIG. 15. As shown in FIG. 14, the arrangement area of the object images O6 through O8 is a range from a point p3 (−350,700) to a point p4 (−110,1150) on the x-y plane. Therefore, the arrangement area of the object images O6 through O8 is out of the range from the point p1 (0,0) to the point p2 (1919,1079) as the initial drawing area D0. The drawing controller 174 expands the drawing area D so that the arrangement area of the object images O6 through O8 is included. Specifically, as shown in FIG. 15, the drawing controller 174 sets the drawing area D to a range from a point p5 (−350,0) to a point p6 (1919,1150). The drawing area D having been expanded is described as drawing area D1. Thus, the object images O6 through O8 are included in the drawing area D1. In other words, the drawing area D is an area having a first rectangular shape defined by the x axis and the y axis, and the area in which the new object images O6 through O8 are arranged is an area having a second rectangular shape surrounding both ends along the x axis of each of the new object images O6 through O8, and both ends along the y axis of each of the new object images O6 through O8. Adding the arrangement area of the object images O6 through O8 thus drawn to the drawing area D is expanding the first rectangular shape so that the whole of the second rectangular shape is included in the first rectangular shape.

It should be noted that the arrangement areas of the respective object images O6 through O8 are united into one area in the explanation described above, but in reality, whether or not the expansion of the drawing area D is necessary is determined every time one of the object images O is drawn, and the drawing area D is expanded as needed. Further, it is possible for the drawing controller 174 to set a point located at a predetermined distance toward the expansion direction from the arrangement area of the object image O as the range of the drawing area D when expanding the drawing area D. This is for preventing the object image O located in an end portion from being displayed on the edge of the projection range R to improve the visibility when performing the whole display described later.

FIG. 16 shows a display example when performing the whole display of the drawing area D1. When a whole display icon 48 shown in FIG. 26 is selected after the drawing area D is expanded, the drawing controller 174 reduces the drawing area D so that the whole of the drawing area D shows up in the projection range R, and displays the result as a whole display screen 50. In other words, when the drawing controller 174 receives an operation of selecting the whole display icon 48, the drawing controller 174 displays a reduced screen obtained by reducing the whole of the drawing area D into the size of the projection range R in the projection range R. The operation of selecting the whole display icon 48 is an example of a predetermined operation. Hereinafter, when it is necessary to distinguish the individual whole display screens 50 from each other, there are used the descriptions of whole display screens 50A, 50B, . . . . The whole display screen 50A in FIG. 16 is a screen for displaying the whole of the drawing area D1 shown in FIG. 15. An aspect ratio of the drawing area D1 has a landscape shape having an aspect ratio higher in ratio of the x-axis direction than the aspect ratio of the projection range R. Therefore, the length in the x-axis direction of the drawing area D1 is reduced in accordance with the length in the X-axis direction of the projection range R. FIG. 17 is a table of the parameters representing the correspondence relationship between the projection range R shown in FIG. 16 and the drawing area D. A reduction ratio of the projection range R in FIG. 16 is 85%. It should be noted that it is possible to stop the reception of the drawing input during the display of the whole display screen 50.

D-3. Reduction of Drawing Area D

Then, a method of reducing the drawing area D will be described. When the object image O in the drawing reception screen 30 is erased, the drawing controller 174 reduces the drawing area D. In other words, when an operation of erasing at least a part of the object image O included in the drawing reception screen 30 is performed, the drawing controller 174 excludes an area in which the at least a part has once been arranged from the drawing area D. This is because when the area in which the object image O has been erased is kept included in the drawing area D, the reduction ratio rises when, for example, performing the whole display, and thus, there is a problem that the object image O actually drawn is not eye-friendly. It should be noted that the reduction of the drawing area D is performed only when the object image O located near to the end portion of the drawing reception screen 30 is erased. The object image O located near to the end portion means, for example, the object image O located so that no other object image O is arranged closer to the end portion than the object image O.

Figure 18:
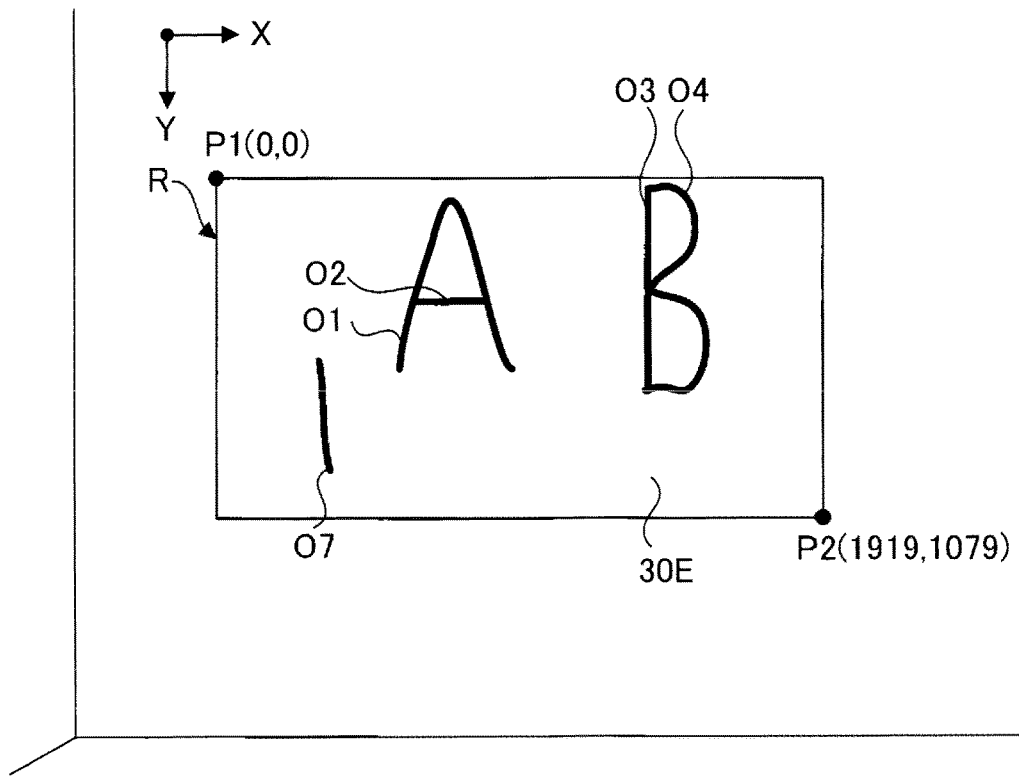
FIG. 18 is a diagram showing an example of the drawing reception screen.

It is assumed that the erasure of the object images O6, O8 is performed as in the drawing reception screen 30E shown in, for example, FIG. 18 on the drawing reception screen 30D in which the object images O1 through O4, O6 through O8 are displayed, and which is shown in, for example, FIG. 12. The erasure of the object image O is performed by, for example, moving the pointer 20 on the object image O which is desired to be erased with an erasure icon 44 described later selected. It should be noted that the whole of the object image O is erased in the following example, but it is possible to partially erase a part of a single object image O.

Figure 19:
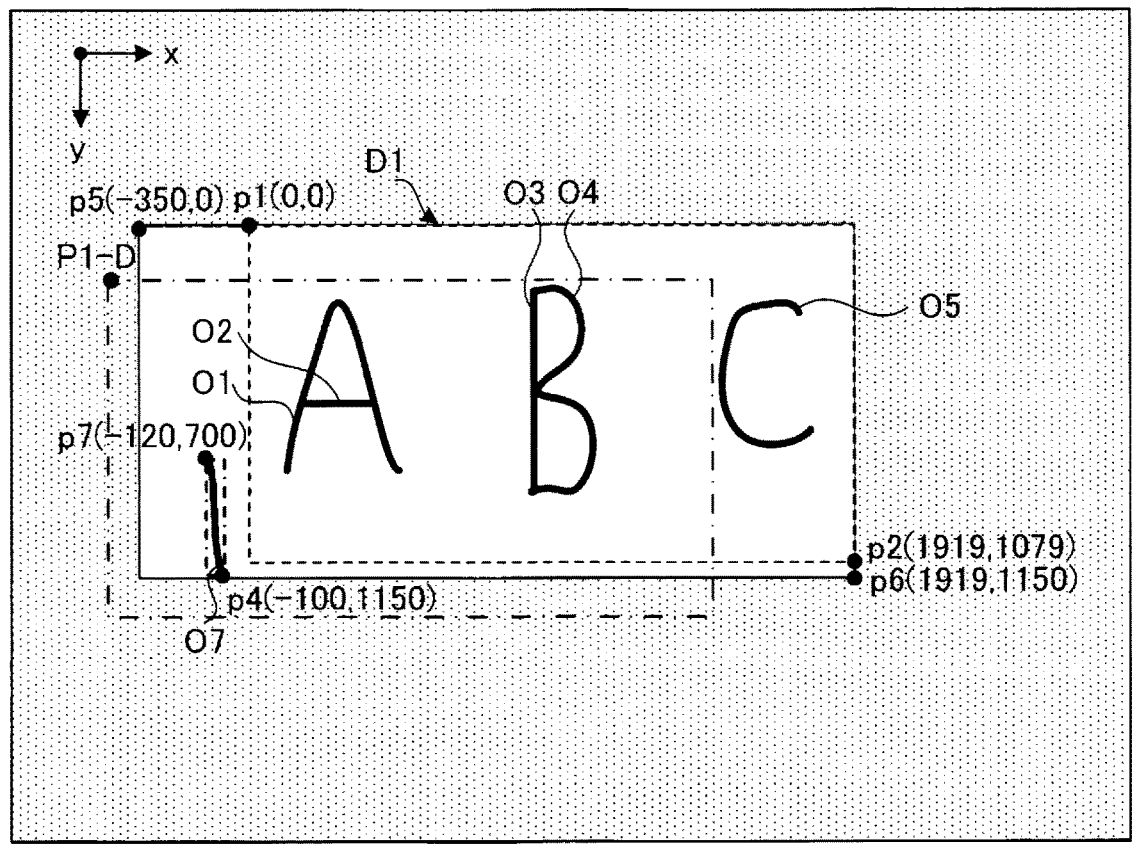
FIG. 19 is a diagram schematically showing the drawing area.

FIG. 19 is a diagram showing the drawing area D1 in which the object images O6, O8 are erased. As described above, the drawing area D1 is the range from the point p5 (−350,0) to the point p6 (1919,1150). The drawing controller 174 identifies the arrangement areas of all of the object images O located outside the initial drawing area D0, and when an area Dx including the vertexes of the initial drawing area D0 and all of the arrangement areas located outside the initial drawing area D0 is smaller than the drawing area D1, the drawing controller 174 sets the area Dx as the drawing area D after the reduction. It should be noted that the area Dx is displayed in FIG. 20.

Figure 20:
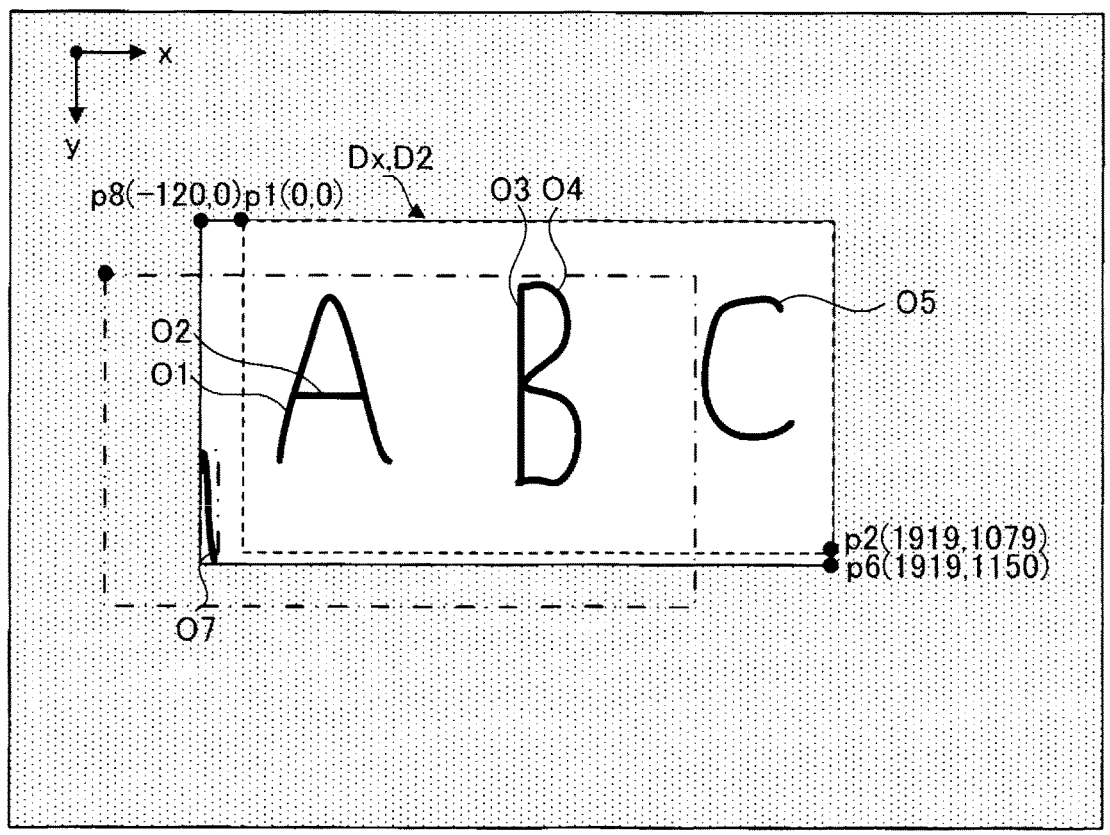
FIG. 20 is a diagram schematically showing the drawing area.
Figure 21:
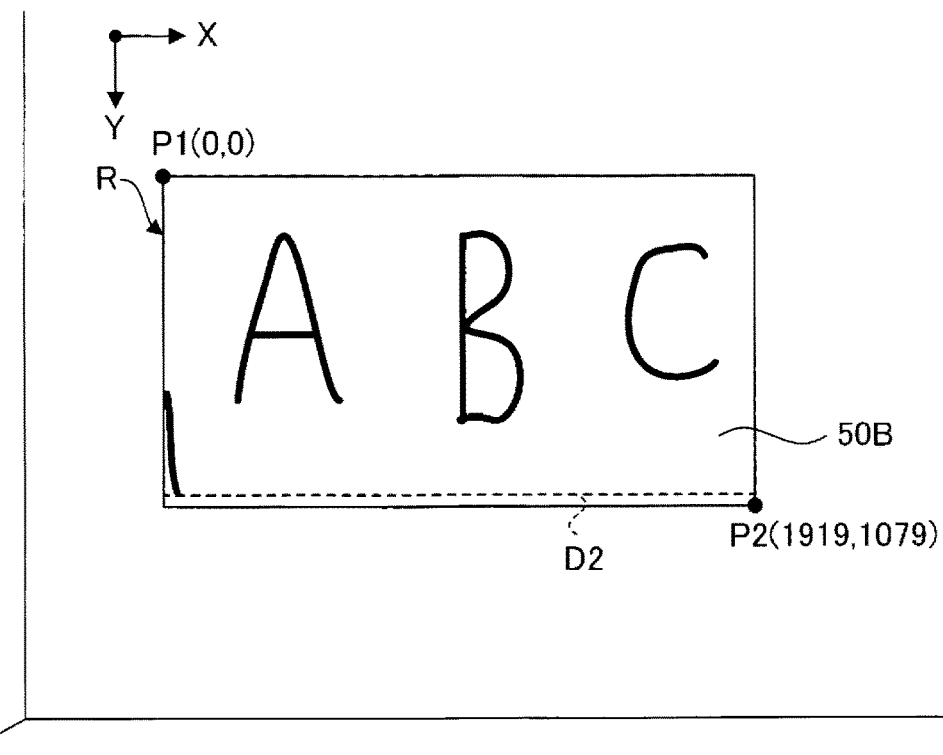
FIG. 21 is a diagram showing an example of the whole display screen.

In FIG. 19, the object image O located outside the initial drawing area D0 is the object image O7 alone. The arrangement area of the object image O7 is located in a range from a point p7 (−120,700) to the point p4 (−110,1150). Therefore, the area Dx is a range from the point p8 (−120,0) to the point p6 (1919,1150). Since the area Dx is smaller than the drawing area D1, the area Dx is set as a new drawing area D2 as shown in FIG. 20. In other words, excluding the area in which the object image O having been erased has been arranged from the drawing area D is changing the drawing area D into a rectangular shape surrounding both ends along the x axis of one object image O or a plurality of object images O remaining in the drawing area D and both ends along the y axis of the one object image O or the plurality of object images O remaining in the drawing area D. FIG. 21 shows a display example when performing the whole display of the drawing area D2. The whole display screen 50B shown in FIG. 21 is made lower in reduction ratio compared to the whole display screen 50A of the drawing area D1 shown in FIG. 16, and it is understood that the drawing area D is reduced.

It should be noted that when the area Dx is equal to the drawing area D, the reduction of the drawing area D is not performed. Specifically, when only the object images O7, O8 out of the object images O shown in, for example, FIG. 12 are erased, the drawing area D is not reduced.

Further, when the drawing area D is decided based only on, for example, the arrangement area of the object image O, it results in that the drawing area D disappears when all of the object images O in the drawing area D are erased. In order to prevent the above, when reducing the drawing area D, the drawing controller 174 keeps the size of the drawing area D in at least the size of the projection range R. In the present embodiment, when reducing the drawing area D, the drawing controller 174 includes the initial drawing area D0 in the drawing area D irrespective of the presence or absence of the object image O.

D-4. Initial Drawing Area D0

As described above, the initial drawing area D0 is the range from the point p1 (0,0) to the point p2 (1919,1079), and the drawing reception screen 30 displayed in the projection range R immediately after the drawing mode is started is the screen for receiving the drawing to the initial drawing area D0. Since no object image O is drawing when starting the drawing mode, it can be said that the initial drawing area D0 is a stationary drawing area included in the drawing area D irrespective of the presence or absence of the arrangement of the object image O. In the present embodiment, when keeping the size of the drawing area D in at least the size of the projection range R, the drawing controller 174 keeps the initial drawing area D0 as the drawing area D.

Figure 22:
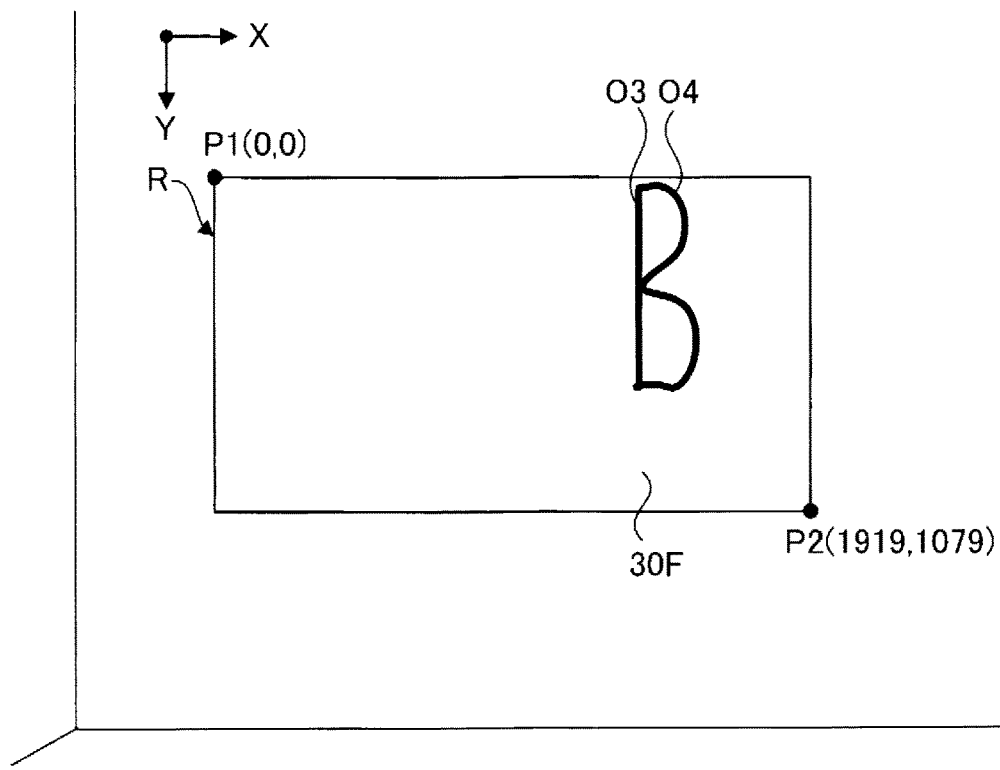
FIG. 22 is a diagram showing an example of the drawing reception screen.
Figure 23:
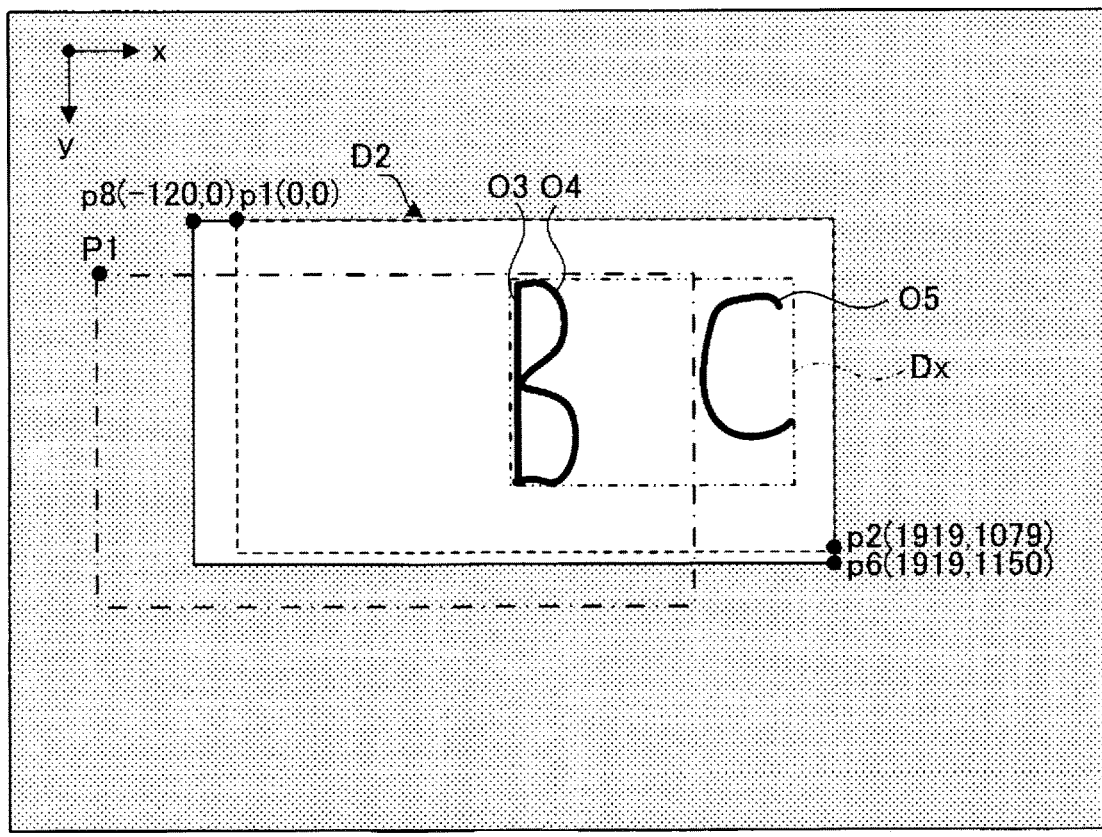
FIG. 23 is a diagram schematically showing the drawing area.
Figure 24:
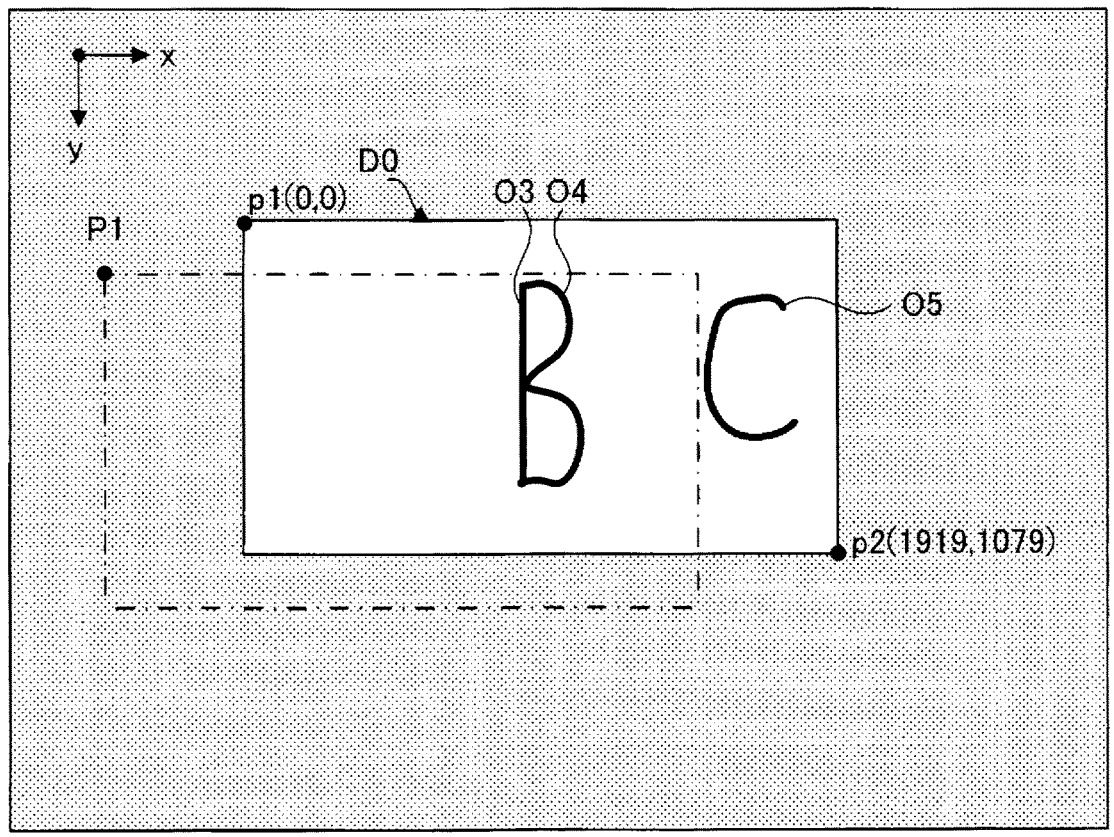
FIG. 24 is a diagram schematically showing the drawing area.
Figure 25:
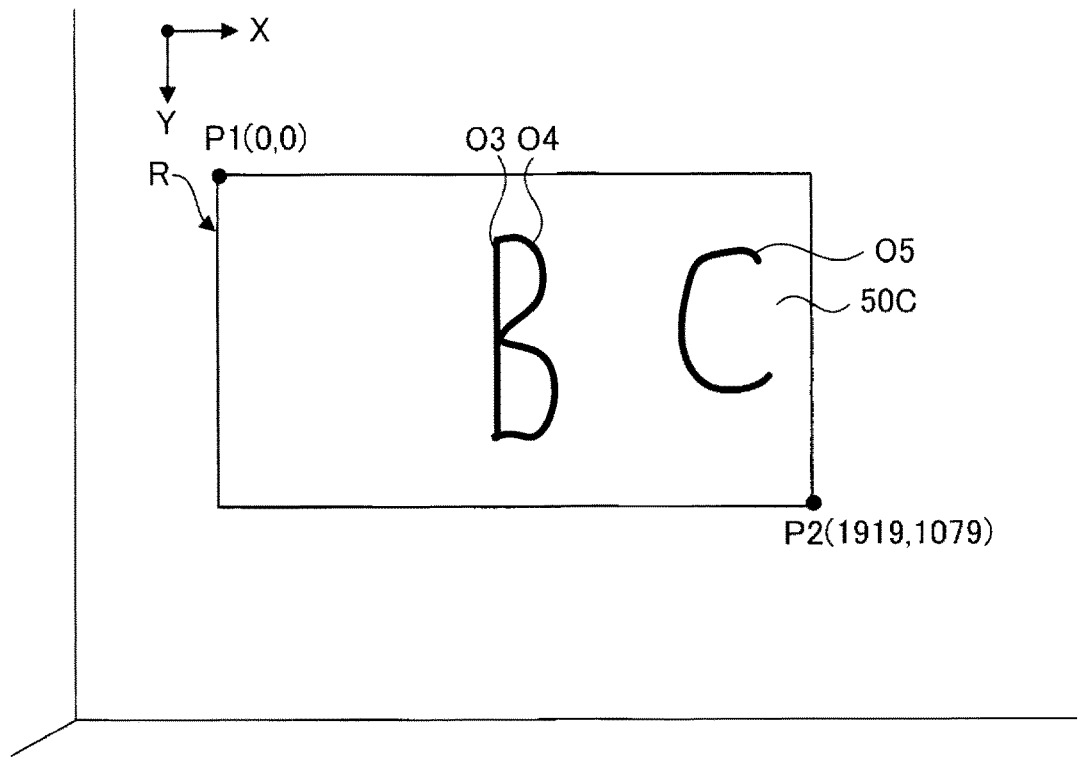
FIG. 25 is a diagram showing an example of the whole display screen.

It is assumed that the object images O1, O2, and O7 are erased as in the drawing reception screen 30F shown in, for example, FIG. 22 in the drawing reception screen 30E in which the object images O1 through O4 and O7 are displayed, and which is shown in, for example, FIG. 12. FIG. 23 shows the drawing area D2 corresponding to FIG. 22. In the drawing area D2 shown in FIG. 22, the object images O1, O2, and O7 are erased, and the object images O3 through O5 remain. Therefore, it is conceivable that the drawing area D is reduced in accordance with the area Dx in which the object images O3 through O5 are arranged. However, in the present embodiment, the drawing controller 174 keeps the range of the initial drawing area D0 as the drawing area D. FIG. 24 is a diagram showing the state in which the drawing area D is set to the range of the initial drawing area D0. Further, FIG. 25 shows the whole display screen 50C obtained by performing the whole display of the initial drawing area D0 shown in FIG. 24. In the whole display screen 50C, the object images O3 through O5 are displayed at substantially the same positions as in the drawing reception screen 30B shown in FIG. 7.

As described above, by keeping the size of the drawing area D in at least the size of the projection range R, a certain range of the drawing area D is maintained even when there temporarily occurs, for example, the state in which the object image O is not arranged in the process of the drawing operation, and thus, it is possible to enhance the convenience in a drawing work. Further, since the initial drawing area D0 is kept as the drawing area D when keeping the size of the drawing area D in at least the size of the projection range R, the area kept as the drawing area D becomes clear, and thus, it is possible to enhance the convenience in the drawing work.

D-5. Drawing Menu Icons 40

Then, the drawing menu icons 40 will be described. FIG. 26 is an enlarged view of the drawing menu icons 40. In the drawing reception screen 30, there are displayed the drawing menu icons 40. In the present embodiment, as the drawing menu icons 40, there are displayed the pen icon 42, the erasure icon 44, the scroll icon 46, and the whole display icon 48. When the user taps a desired icon with the pointer 20, there occurs a state in which that icon is selected. It can be arranged that the selected icon is changed in display configuration such as a color.

In the state in which the pen icon 42 is selected, when the pointer 20 moves while keeping contact with the projection range R, a line is displayed along the trajectory of the movement. This line forms the object image O. The state in which the pen icon 42 is selected is defined as a "pen mode." In the state in which the erasure icon 44 is selected, when the pointer 20 moves while keeping contact with the projection range R, an area in the object image O located on the trajectory of the movement is erased. The state in which the erasure icon 44 is selected is defined as an "erasure mode." In the state in which the scroll icon 46 is selected, when the pointer 20 moves while keeping contact with the projection range R, the drawing reception screen 30 scrolls along the direction of the movement. The state in which the scroll icon 46 is selected is defined as a "scroll mode." When the whole display icon 48 is selected, the whole display screen 50 for displaying the whole of the drawing area D is displayed in the projection range R. During the display of the whole display screen 50, an icon for restoring the display in the projection range R to the drawing reception screen 30 can be displayed. Further, besides the above, it is possible to display a zoom icon for scaling the display image at an arbitrary magnification ratio, a save icon for terminating the drawing to save the drawn image, and so on.

D-6. Method of Drawing Object Image O

Then, a method of drawing the object image O will be described. As described above, the object image O is a trajectory of the contact position between the pointer 20 and the projection range R. Therefore, the drawing controller 174 continuously detects the contact position of the pointer 20 to detect the trajectory of the contact position of the pointer 20 in the projection range R during a period from when the pointer 20 makes contact with the projection range R to when the pointer 20 is separated therefrom. More particularly, the drawing controller 174 analyzes the latest infrared light imaging datum every time the infrared light imaging datum is generated to determine whether or not the infrared light is included in the latest infrared light imaging datum. When the infrared light is included in the infrared light imaging datum, the drawing controller 174 detects a position H of the infrared light on the infrared light imaging datum, and further, converts the position H into a contact position Ha on the frame memory using the calibration datum.

Hereinafter, when the positions H in the infrared light imaging data and the contact positions Ha into which the positions H are converted are each discriminated from each other, there are used the descriptions of the position H(n) and the contact position Ha(n). It is assumed that n is identification information for identifying the generation timing of the infrared light imaging datum, and takes values of contiguous integers. From one infrared light imaging datum, there is obtained one position H, and there is obtained one contact position Ha corresponding to the position H. Therefore, n also functions as identification information for identifying the contact position Ha.

FIG. 27 is a diagram schematically showing a trajectory of the contact position of the pointer 20. The trajectory T of the contact position of the pointer 20 includes a starting point Hs and an ending point He. When the latest contact position Ha(n) is detected, the drawing controller 174 sets the latest contact position Ha(n) as the starting point Hs of the movement trajectory when the infrared light was not detected in the infrared light imaging datum generated last time, namely when the contact position Ha(n−1) does not exist. The drawing controller 174 associates each of the contact positions Ha(n+1), Ha(n+2), . . . based on the infrared light imaging data subsequently generated with the previous contact position Ha in sequence to generate the trajectory T. Further, when the detection of the infrared light in the infrared light imaging datum stops, the drawing controller 174 sets the contact position Ha detected lastly as the ending point He of the movement trajectory. In the example shown in FIG. 27, the contact position is not detected after the contact position Ha(n+x). For example, the contact position Ha(n+x+1) is not detected. Therefore, the contact position Ha(n+x) becomes the ending point He of the trajectory T.

The drawing controller 174 adds the contact position Ha to the object information of the drawing datum DT every time the contact position Ha is detected. FIG. 28 is a diagram schematically showing the drawing datum DT. Each of the rows of the drawing datum DT shown in FIG. 28 corresponds to the object information as information of individual object image O. The object information is generated when the pointer 20 makes contact with the projection range R, and the starting point of the trajectory T has been detected.

Further, the object information is erased when the object image O is erased by the erasure operation using the erasure icon 44.

The object information includes identification information N1, coordinate information N2, color information N3, line type information N4, and width information N5 of the object image O. The identification information N1 is information for identifying the object image O. The coordinate information N2 is information representing the trajectory T of the contact position Ha when the object image O was drawn. The shape of the object image O is defined by the coordinate information N2. The color information N3 represents a display color of the object image O in the drawing reception screen 30. The line type information N4 represents a line type of the object image O in the drawing reception screen 30. The width information N5 represents a drawing width of the object image O in the drawing reception screen 30. The color information N3, the line type information N4, and the width information N5 can be designated by the user in the setting screen in, for example, the drawing mode.

The object image O is constituted by dots arranged at points on the frame memory identified by the coordinate information T2 described above, and connection lines for connecting the dots adjacent to each other. A central position of this dot is the contact position Ha, and a diameter of this dot is a length corresponding to a drawing width identified by the width information T5. The wider the drawing width is, the larger the diameter of the dot becomes. Further, the line type of the connection lines is identified by the line type information T4. Further, the display color of the dots and the connection lines is identified by the color information T3.

D-7. Flowchart

Figure 29:
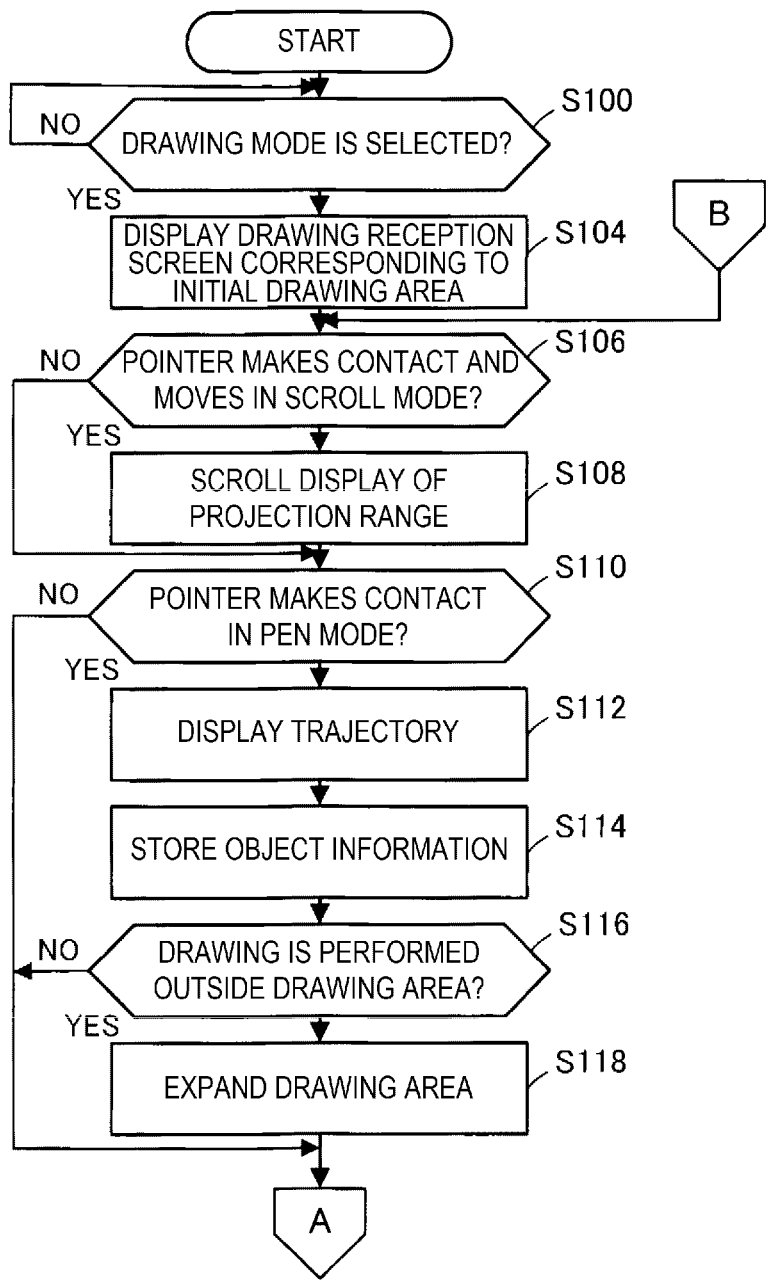
FIG. 29 is a flowchart showing a flow of an image processing method to be executed by a processing unit of the projector in accordance with a control program.
Figure 30:
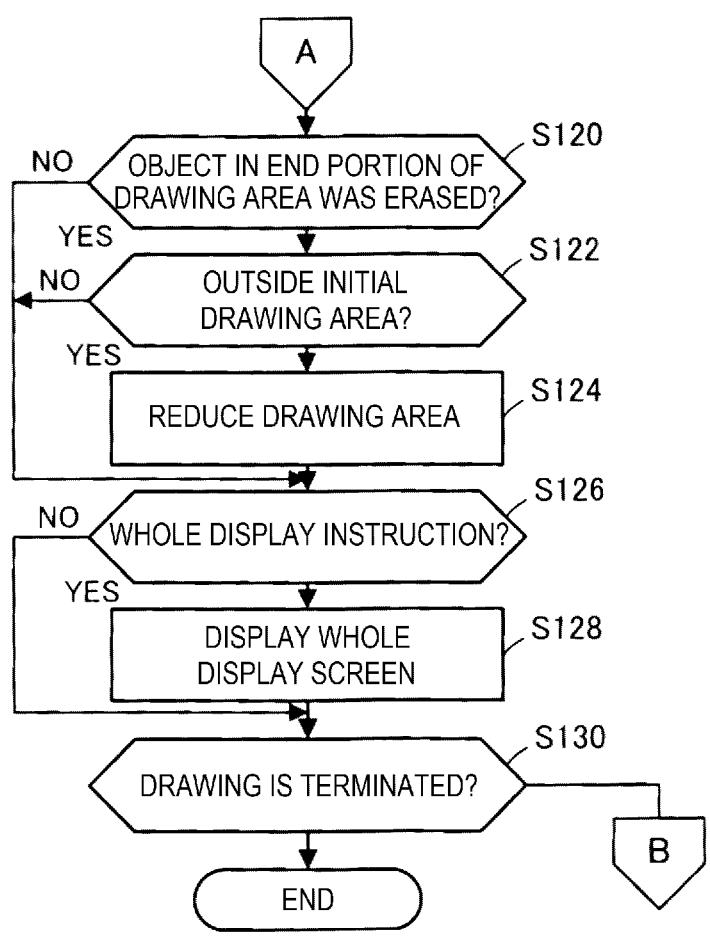
FIG. 30 is a flowchart showing the flow of the image processing method to be executed by the processing unit of the projector in accordance with the control program.

FIG. 29 and FIG. 30 show a flowchart showing a flow of an image processing method to be executed by the processing unit 17 of the projector 10 in accordance with the control program 162. The processing unit 17 functions as the drawing controller 174 to thereby execute the steps shown in FIG. 29 and FIG. 30.

The processing unit 17 waits until the drawing mode is selected (NO in the step S100), and when it is detected that the drawing mode has been selected (YES in the step S100), the processing unit 17 displays (step S104) the drawing reception screen 30 corresponding to the initial drawing area D0 in the projection range R. When it is detected that the pointer 20 makes contact with the projection range R in the scroll mode, and has moved in any direction (YES in the step S106), the processing unit 17 scrolls (step S108) the display of the drawing area D in the projection range R in the direction in which the pointer 20 has moved. When a mode other than the scroll mode is selected, when the pointer 20 does not make contact with the projection range R in the scroll mode, or when the pointer 20 has made contact with the projection range R but does not move in the scroll mode (NO in the step S106), the processing unit 17 makes the transition to the step S110.

Further, when it is detected that the pointer 20 made contact with the projection range R in the pen mode (YES in the step S110), the processing unit 17 displays (step S112) the trajectory of the movement of the pointer 20 in the projection range R as the object image O. It should be noted that when the pointer 20 is separated from the projection range R while being kept unmoved, a dot is displayed at the contact position of the pointer 20. Further, the processing unit 17 records (step S114) the coordinates of the trajectory and so on as the object information. Further, when a mode other than the pen mode is selected, or when the pointer 20 does not make contact with the projection range R in the pen mode (NO in the step S110), the processing unit 17 makes the transition to the step S120.

When the object image O is drawn outside the range of the drawing area D (YES in the step S116), the processing unit 17 expands (step S118) the drawing area D in accordance with the arrangement area of the object image O. When no object image O is drawn outside the range of the drawing area D (NO in the step S116), the processing unit 17 makes the transition to the step S120.

Further, when the object image O located around the end portion of the drawing area D has been erased (YES in the step S120), whether or not the object image O thus erased is located outside the range of the initial drawing area D0 is determined (step S122). When the object image O thus erased is located outside the range of the initial drawing area D0 (YES in the step S122), the processing unit 17 reduces (step S124) the drawing area D in accordance with the arrangement area of the remaining object image O. It should be noted that when the object image O is not erased, or when the object image O located around the center of the drawing area D is erased (NO in the step S120), the processing unit 17 makes the transition to the step S126. Further, when the object image O thus erased is not located outside the range of the initial drawing area D0 (NO in the step S122), namely when the object image O thus erased is located inside the range of the initial drawing area D0, the processing unit 17 makes the transition to the step S126.

The processing unit 17 detects that the whole display icon 48 has been selected to make the whole display instruction (YES in the step S126), the processing unit 17 displays the whole of the drawing area D at that moment in the projection range R (step S128). When the whole display instruction is not made (NO in the step S126), the processing unit 17 makes the transition to the step S130. The processing unit 17 returns to the step S106 to repeat the subsequent processing until the user terminates the drawing (NO in the step S130). When the user terminates the drawing (YES in the step S130), the processing unit 17 ends the processing in the present flowchart.

As described hereinabove, when the operation of erasing at least a part of the object image O included in the drawing reception screen 30 has been performed, the projector 10 according to the present embodiment excludes the area in which the part of the object image O thus erased has once been arranged from the drawing area D. Thus, it is possible to prevent the area in which the object image O is no longer arranged from being included in the drawing area D to thereby appropriately maintain the range of the drawing area D, and thus, it is possible to improve the operability in the drawing operation. Further, when the whole display icon 48 has been selected, the projector 10 displays the whole display screen 50 obtained by reducing the whole of the drawing area D into the size of the projection range R in the projection range R. Thus, in particular when performing drawing in a range larger than the projection range R, it is possible for the user to figure out the whole of the image drawn by the user, and thus, it is possible to improve the operability in the drawing operation. Further, in the projector 10, since the area in which no object image O is arranged is excluded from the drawing area D, only the portion in which the object image O is arranged is displayed in the whole display screen 50. Therefore, it is possible to display only the portion which the user needs as the whole display screen 50, and thus, it is possible to enhance the convenience in the drawing work.

Further, when reducing the drawing area D, the projector 10 keeps the size of the drawing area D in at least the size of the projection range R. Thus, even when there temporarily occurs, for example, the state in which the object image O is not arranged in the process of the drawing operation, a certain range of the drawing area D is maintained, and it is possible to enhance the convenience in the drawing work. Further, when keeping the size of the drawing area D in at least the size of the projection range R, the projector 10 keeps the initial drawing area D0 as the drawing area D. Thus, the area kept as the drawing area D becomes clear, and it is possible to enhance the convenience in the drawing work. Further, when the projector 10 reduces the drawing area D, the projector 10 changes the drawing area D to the rectangular shape surrounding the both ends along the x axis and the both ends along the y axis of the object image O remaining in the drawing area D. Thus, it is possible to simply and surely reduce the drawing area D.

Further, when the scrolling operation to the drawing reception screen 30 has been performed, the projector 10 displays the new drawing reception screen 30 including the range of the drawing area D corresponding to the scrolling operation in the projection range R, and when the operation of drawing the new object image O in the new drawing reception screen 30 has been performed, the area in which the new object image O has been arranged is added to the drawing area D. Thus, it is possible for the user to perform the drawing at an arbitrary position, and thus, it is possible to enhance the convenience in the drawing work. Further, when adding the area in which the new object image O has been arranged to the drawing area D, the projector 10 expands the rectangular shape defining the drawing area D so that the whole of the rectangular shape surrounding the both ends along the first axis and the both ends along the y axis of the new object image O is included in the rectangular shape defining the drawing area D. Thus, it is possible to simply and surely expand the drawing area D.

E. MODIFIED EXAMPLES

Each of the aspects illustrated hereinabove can variously be modified. Some aspects of the specific modifications which can be applied to each of the aspects described above will be illustrated below. Two or more aspects arbitrarily selected from the following illustrations can arbitrarily be combined with each other unless conflicting with each other.

E-1. Modified Example 1

In the embodiment described above, the description is presented assuming that the image processing device is the projector 10. This is not a limitation, and the image processing device can be a portable information processing device or the like equipped with a computer coupled to a display or a display. In this case, the display functions as a display device. The display can be, for example, an FPD (Flat Panel Display). The FPD is, for example, a liquid crystal display, a plasma display, or an organic EL (Electro Luminescence) display.

E-2. Modified Example 2

In the embodiment described above, it is assumed that the position of the pointer 20 is detected using the infrared light, but the detection method of the position of the pointer 20 is not limited thereto, and a variety of methods known to the public can be applied. For example, it is possible for the detection device for detecting the position of the pointer 20 to irradiate the pointer 20 with light having a predetermined wavelength, and receive the light reflected by the pointer 20 to thereby detect the position of the pointer 20. The detection device can be a device for detecting a position where the light is blocked by the pointer 20 using a device for emitting the infrared light or a laser source, and a light receiving device. When using these methods, the pointer 20 can be a finger of the user.

E-3. Modified Example 3

In the embodiment described above, the size of the drawing area D is kept in at least the size of the projection range R. On this occasion, what is kept as the drawing area D is the initial drawing area D0. This is not a limitation, and an area shifted from the initial drawing area D0 can be kept as the drawing area D. For example, in a state in which the object image O is not drawn in the initial drawing area D0, and the object image O is drawn only at the position shifted from the initial drawing area D0, the periphery of the area in which the object image O is drawn can be kept as the drawing area D. Thus, it is possible for the user to keep an arbitrary area as the drawing area D.

What is claimed is:

1. An image processing method comprising:
   displaying a first screen on a display surface, the first screen including at least a part of a drawing area in which at least one object image drawn by a user is arranged;
   excluding an area in which at least a part of an object image included in the first screen is arranged from the drawing area when an operation of erasing the at least a part of the object is received; and
   displaying a reduced screen on the display surface when an operation is received, the reduced screen being obtained by reducing a whole of the drawing area into a size of the display surface, wherein the whole of the drawing area is not reduced to an area less than a predetermined drawing area,
   wherein the whole of the drawing area is reduced only when the at least a part of the object that is erased is the closest part of the object from an end portion of the first screen and spaced from the end portion of the first screen.

2. The image processing method according to claim 1, wherein
   the excluding includes keeping a size of the drawing area in at least the size of the display surface.

3. The image processing method according to claim 2, wherein
   the drawing area include a stationary drawing area irrespective of presence or absence of the object image, and
   the keeping includes keeping the stationary drawing area as the drawing area.

4. The image processing method according to claim 1, wherein
   the drawing area is an area having a first rectangular shape defined by a first axis and a second axis perpendicular to the first axis, and
   the excluding is changing the drawing area into a rectangular shape surrounding both ends along the first axis of at least one object image remaining in the drawing area and both ends along the second axis of the at least one object image remaining in the drawing area.

5. The image processing method according to claim 4, further comprising:
   displaying a second screen on the display surface, the second screen including a range of the drawing area corresponding to a scrolling operation to the first screen; and
   adding an area in which a new object image is arranged to the drawing area when an operation of drawing the new object image in the second screen is received.

6. The image processing method according to claim 5, wherein
   the area is an area having a second rectangular shape surrounding both ends along the first axis of the new object image and both ends along the second axis of the new object image, and
   adding the area is expanding the first rectangular shape to include a whole of the second rectangular shape in the first rectangular shape.

7. The image processing method according to claim 1, wherein in the displaying the first screen on the display surface, the first screen includes the at least the part of the drawing area, but not all of the drawing area, in which at least one object image drawn by the user is arranged.

8. An image processing device comprising:
   a display device; and
   at least one processor programmed to
      display a first screen on a display surface using the display device, the first screen including at least a part of a drawing area in which at least one object image drawn by a user is arranged,
      exclude an area in which at least a part of an object image included in the first screen is arranged from the drawing area when an operation of erasing the at least a part of the object is received, and
      display a reduced screen on the display surface using the display device when an operation is received, the reduced screen being obtained by reducing a whole of the drawing area into a size of the display surface, wherein the whole of the drawing area is not reduced to an area less than a predetermined drawing area,
   wherein the whole of the drawing area is reduced only when the at least a part of the object that is erased is the closest part of the object from an end portion of the first screen and spaced from the end portion of the first screen.

* * * * *